United States Patent
Laine et al.

(10) Patent No.: US 10,235,338 B2
(45) Date of Patent: Mar. 19, 2019

(54) SHORT STACK TRAVERSAL OF TREE DATA STRUCTURES

(71) Applicant: NVIDIA Corporation, Santa Clara, CA (US)

(72) Inventors: Samuli Matias Laine, Vantaa (FI); Timo Oskari Aila, Tuusula (FI)

(73) Assignee: NVIDIA CORPORATION, Santa Clara, CA (US)

( * ) Notice: Subject to any disclaimer, the term of this patent is extended or adjusted under 35 U.S.C. 154(b) by 849 days.

(21) Appl. No.: 14/563,872

(22) Filed: Dec. 8, 2014

(65) Prior Publication Data
US 2016/0070820 A1   Mar. 10, 2016

Related U.S. Application Data

(60) Provisional application No. 62/046,093, filed on Sep. 4, 2014.

(51) Int. Cl.
*G06F 17/30* (2006.01)
*G06F 16/901* (2019.01)
(Continued)

(52) U.S. Cl.
CPC ...... *G06F 16/9027* (2019.01); *G06F 16/2246* (2019.01); *G06F 16/254* (2019.01); *G06F 17/30327* (2013.01); *G06F 17/30563* (2013.01); *G06F 17/30961* (2013.01); *G06T 1/60* (2013.01); *G06T 9/40* (2013.01); *G06T 15/005* (2013.01); *G06T 15/06* (2013.01); *G06T 15/08* (2013.01); *G06T 15/10* (2013.01); *G06T 15/80* (2013.01); *G06T 17/10* (2013.01); *H04N 19/174* (2014.11); *H04N 19/44* (2014.11)

(58) Field of Classification Search
None
See application file for complete search history.

(56) References Cited

U.S. PATENT DOCUMENTS

| 6,184,897 B1 | 2/2001 | Gueziec et al. |
| 6,326,963 B1 | 12/2001 | Meehan |
| (Continued) | | |

OTHER PUBLICATIONS

Barringer, R. et al., "Dynamic Stackless Binary Tree Traversal," Journal of Computer Graphics Techniques, vol. 2, No. 1, 2013, pp. 38-49.

(Continued)

*Primary Examiner* — Amresh Singh
(74) *Attorney, Agent, or Firm* — Zilka-Kotab, PC

(57) ABSTRACT

A system, computer readable medium, and method are disclosed for performing a tree traversal operation utilizing a short stack data structure. The method includes the steps of executing, via a processor, a tree traversal operation for a tree data structure utilizing a short stack data structure, determining that the short stack data structure is empty after testing a current node in the tree traversal operation, and executing, via the processor, a back-tracking operation for the current node to identify a new node in the tree data structure to continue the tree traversal operation. The processor may be a parallel processing unit that includes one or more tree traversal units, which implement the tree traversal operation in hardware, software, or a combination of hardware and software.

21 Claims, 17 Drawing Sheets

(51) Int. Cl.

| | |
|---|---|
| G06F 16/25 | (2019.01) |
| G06F 16/22 | (2019.01) |
| G06T 15/00 | (2011.01) |
| G06T 15/06 | (2011.01) |
| G06T 15/80 | (2011.01) |
| G06T 15/08 | (2011.01) |
| G06T 15/10 | (2011.01) |
| H04N 19/174 | (2014.01) |
| H04N 19/44 | (2014.01) |
| G06T 1/60 | (2006.01) |
| G06T 17/10 | (2006.01) |
| G06T 9/40 | (2006.01) |

(56) References Cited

U.S. PATENT DOCUMENTS

| | | | |
|---|---|---|---|
| 6,373,488 | B1 | 4/2002 | Gasper et al. |
| 7,064,766 | B2 | 6/2006 | Beda et al. |
| 7,145,562 | B2 | 12/2006 | Schechter et al. |
| 7,161,599 | B2 | 1/2007 | Beda et al. |
| 7,337,163 | B1 | 2/2008 | Srinivasan et al. |
| 7,477,259 | B2 | 1/2009 | Beda et al. |
| 7,495,664 | B2 | 2/2009 | Keller et al. |
| 7,619,633 | B2 | 11/2009 | Beda et al. |
| 7,705,851 | B2 | 4/2010 | Beda et al. |
| 7,792,817 | B2 | 9/2010 | Shan et al. |
| 7,808,506 | B2 | 10/2010 | Beda et al. |
| 7,930,311 | B2 | 4/2011 | Feng et al. |
| 8,217,935 | B2 | 7/2012 | Purcell et al. |
| 8,452,088 | B1 | 5/2013 | De Ponti et al. |
| 8,502,819 | B1* | 8/2013 | Aila ............... G06T 15/06 345/419 |
| 8,791,945 | B2 | 7/2014 | Clarberg et al. |
| 9,146,957 | B2 | 9/2015 | Wong |
| 9,552,664 | B2 | 1/2017 | Laine et al. |
| 9,582,607 | B2 | 2/2017 | Laine et al. |
| 10,025,879 | B2 | 7/2018 | Karras et al. |
| 10,032,289 | B2 | 7/2018 | Laine et al. |
| 2003/0076328 | A1 | 4/2003 | Beda et al. |
| 2003/0076329 | A1 | 4/2003 | Beda et al. |
| 2004/0130550 | A1 | 7/2004 | Blanco et al. |
| 2006/0244754 | A1 | 11/2006 | Beda et al. |
| 2007/0024615 | A1 | 2/2007 | Keller et al. |
| 2007/0182732 | A1 | 8/2007 | Woop et al. |
| 2008/0040384 | A1 | 2/2008 | Kuznetsov |
| 2008/0259075 | A1 | 10/2008 | Fowler et al. |
| 2009/0256845 | A1 | 10/2009 | Sevastianov et al. |
| 2010/0192215 | A1 | 7/2010 | Yaxuan et al. |
| 2010/0238169 | A1 | 9/2010 | Fowler et al. |
| 2011/0080403 | A1 | 4/2011 | Ernst et al. |
| 2012/0050289 | A1 | 3/2012 | Park et al. |
| 2012/0268483 | A1 | 10/2012 | Soupikov et al. |
| 2013/0016109 | A1 | 1/2013 | Garanzha |
| 2014/0192904 | A1 | 7/2014 | Rosewarne |
| 2014/0244693 | A1* | 8/2014 | Lee ............... G06T 15/06 707/797 |
| 2015/0109301 | A1 | 4/2015 | Lee et al. |
| 2015/0138202 | A1 | 5/2015 | Lee et al. |
| 2016/0070767 | A1 | 3/2016 | Karras et al. |
| 2016/0070820 | A1 | 3/2016 | Laine et al. |
| 2016/0071312 | A1 | 3/2016 | Laine et al. |
| 2016/0071313 | A1 | 3/2016 | Laine et al. |
| 2017/0116760 | A1 | 4/2017 | Laine et al. |
| 2017/0178387 | A1 | 6/2017 | Woop et al. |

OTHER PUBLICATIONS

Foley, T. et al., "KD-Tree Acceleration Structures for a GPU Raytracer," Graphics Hardware, The Eurographics Association, 2005, pp. 1-8.

Horn et al., "Interactive k-D Tree GPU Raytracing," ACM, Proceedings of the 2007 Symposium on Interactive 3D Graphics and Games, 2007, pp. 1-8.

Kalojanov, J. et al., "Two-Level Grids for Ray Tracing on GPUs," Eurographics, vol. 30, No. 2, 2011, pp. 1-8.

Laine, S., "Restart Trail for Stackless BVH Traversal," High Performance Graphics, The Eurographics Association, 2010, pp. 1-5.

Makinen, E., "A Survey on Binary Tree Codings," The Computer Journal, vol. 34, No. 5, 1991, pp. 438-443.

Parker, S. G. et al., "OptiX: A General Purpose Ray Tracing Engine," ACM Transactions on Graphics, 2010, pp. 1-13.

Wachter, C. et al., "Instant Ray Tracing: The Bounding Interval Hierarchy," Eurographics Symposium on Rendering, The Eurographics Association, 2006, pp. 1-11.

Non-Final Office Action from U.S. Appl. No. 14/589,904, dated Apr. 7, 2016.

Non-Final Office Action from U.S. Appl. No. 14/589,910, dated Feb. 18, 2016.

Mahovsky, J., Ray Tracing with Reduced-Precision Bounding Volume Hierarchies. PhD thesis, University of Calgary, 2005, pp. i-vii, 1-4, 66-70, 84-87, 145-148.

Yoon, S.-E., and Manocha, D., "Cache-efficient layouts of bounding volume hierarchies," Computer Graphics Forum (Eurographics) 25, 2006, pp. 507-516.

Kim, Tae-Joon, et al., "RACBVHs: Random-accessible compressed bounding volume hierarchies," Visualization and Computer Graphics, 2010, pp. 1-8.

Goldsmith, J. et al., "Automatic Creation of Object Hierarchies for Ray Tracing," IEEE CG&A, May 1987, pp. 14-20.

MacDonald, J. D. et al., "Heuristics for ray tracing using space subdivision," The Visual Computer, vol. 6, 1990, pp. 153-166.

Notice of Allowance from U.S. Appl. No. 14/589,910, dated Sep. 13, 2016.

Notice of Allowance from U.S. Appl. No. 14/589,904, dated Oct. 17, 2016.

Non-Final Office Action from U.S. Appl. No. 15/377,959, dated Jun. 15, 2017.

Mahovsky et al., "Memory-Conserving Bounding Volume Hierarchies with Coherent Raytracing," Computer Graphics Forum, vol. 25, No. 2, Blackwell Publishing Ltd, 2006, pp. 1-8.

Notice of Allowance from U.S. Appl. No. 15/377,959, dated Oct. 23, 2017.

Non-Final Office Action from U.S. Appl. No. 14/697,480, dated Sep. 25, 2017.

Notice of Allowance from U.S. Appl. No. 15/377,959, dated Mar. 14, 2018.

Notice of Allowance from U.S. Appl. No. 14/697,480, dated Apr. 11, 2018.

Supplemental Notice of Allowance from U.S. Appl. No. 14/697,480, dated Jun. 25, 2018.

Corrected Notice of Allowance from U.S. Appl. No. 15/377,959, dated Jun. 29, 2018.

\* cited by examiner

SHORT STACK TRAVERSAL OF TREE DATA STRUCTURES

CLAIM OF PRIORITY

This application claims the benefit of U.S. Provisional Application No. 62/046,093 titled "Bounding Volume Hierarchy Representation and Traversal," filed Sep. 4, 2014, the entire contents of which is incorporated herein by reference.

FIELD OF THE INVENTION

The present invention relates to data structure representations, and more particularly to optimizations in traversal of tree data structures.

BACKGROUND

Computer graphics uses a variety of methods to generate two-dimensional representations of a three-dimensional scene. For example, a three-dimensional scene represented as a plurality of geometric primitives (e.g., points, lines, triangles, quads, meshes, etc.) may be rasterized to intersect the geometric primitives with a projection plane and then shaded to calculate a color for one or more pixels of the projection plane based on the rasterization. Alternatively, another technique for generating two-dimensional representations of the three-dimensional scenes is to perform ray-tracing. As is known in the art, ray-tracing is a technique that includes the operation of sending out rays from a particular viewpoint and intersecting the rays with the geometry of the scene. When an intersection is detected, lighting and shading operations may be performed to generate a color value for a pixel of the projection plane intersected by the ray. Additionally, other rays may be generated based on the intersected primitives that contribute to the color of the intersected pixel or other pixels.

Because the number of geometric primitives in a scene may be quite large (e.g., on the order of millions of triangles, etc.) and the number of rays generated to test for intersection against those primitives is also large (e.g., on the order of millions or even billions of rays, etc.), a data structure may be generated to increase the efficiency of performing the intersection tests. One such data structure is a tree, such as a k-d (k-dimensional) tree or a bounding volume hierarchy. When an intersection test is performed for a given ray, a tree traversal may be performed in order to efficiently test the ray against all of the primitives included in the scene. Typically, a tree is traversed by pushing a root node to a traversal stack. The top element in the traversal stack is popped from the stack and the children of the node popped from the stack are tested for intersection with the ray. Any intersected child nodes are then pushed onto the stack and the process is repeated until the stack is empty.

However, the architectures of the processors that implement these operations may inherently have limitations. For example, the space allocated for the traversal stack may be limited in size such that only a fixed number of elements may be pushed onto the stack before there is a stack overflow. Thus, in certain situations, there may be a point in the tree traversal operation where a stack overflow may occur. Thus, there is a need for addressing these issues and/or other issues associated with the prior art.

SUMMARY

A system, computer readable medium, and method are disclosed for performing a tree traversal operation utilizing a short stack data structure. The method includes the steps of executing, via a processor, a tree traversal operation for a tree data structure utilizing a short stack data structure, determining that the short stack data structure is empty after testing a current node in the tree traversal operation, and executing, via the processor, a back-tracking operation for the current node to identify a new node in the tree data structure to continue the tree traversal operation. The processor may be a parallel processing unit that includes one or more tree traversal units, which implement the tree traversal operation in hardware, software, or a combination of hardware and software.

DETAILED DESCRIPTION

Figure 1:
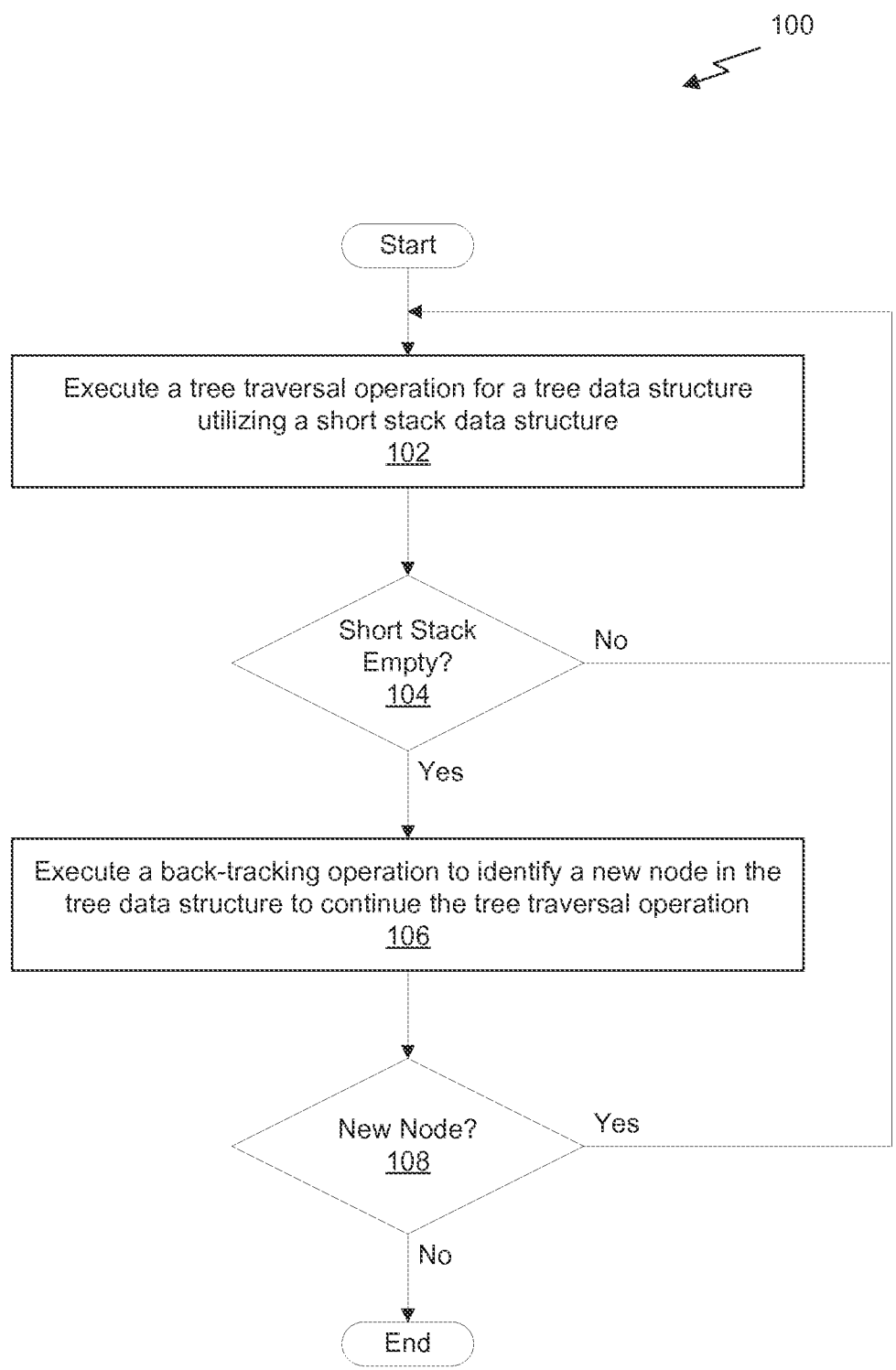
FIG. 1 illustrates a flowchart of a method for performing a tree traversal operation utilizing a short stack data structure, in accordance with one embodiment.

FIG. 1 illustrates a flowchart of a method 100 for performing a tree traversal operation utilizing a short stack data structure, in accordance with one embodiment. At step 102, a tree traversal operation is executed for a tree data structure utilizing a short stack data structure for tracking paths, not immediately taken, of the tree data structure that still need to be processed. The tree traversal operation may be executed by a processor. The short stack data structure may be stored in a memory associated with the processor, such as dedicated on-chip storage or a low-level cache unit to provide relatively fast access to the data included in the short stack data structure. In one embodiment, the tree traversal operation is executed by a tree traversal unit in a parallel processing unit such as a graphics processing unit (GPU). The short stack data structure may be stored in a static memory (e.g., SRAM, etc.) located in the tree traversal unit. The tree traversal operation may be implemented in hardware (e.g., by a static integrated circuit, etc.), software (e.g., one or more instructions implemented by a programmable core or cores, etc.), or a combination of hardware and software. For example, the tree traversal unit may implement various logic that is configured to execute a loop for processing nodes during execution of the tree traversal operation, or the tree traversal unit may include one or more special processing units configured to execute an instruction set, where a plurality of instructions may be executed by the tree traversal unit to implement the tree traversal operation. In some embodiments, multiple tree traversal operations may be in flight simultaneously. In other words, a tree traversal unit may be configured to process multiple tree traversal operations, associated with the same or different tree data structures, in parallel.

The tree traversal operation may be configured to intersect a query data structure with the tree data structure to select one or more elements associated with the tree data structure for further processing. For example, a ray data structure that specifies a ray may be intersected with a bounding volume hierarchy to select one or more geometric primitives associated with the bounding volume hierarchy for further processing.

In one embodiment, a query data structure may represent a geometric shape to intersect with the nodes of the tree data structure, such as an axis-aligned bounding box (AABB), a frustum, or a ray. The tree data structure may be traversed in a depth-first manner starting at the root node of the tree data structure. Paths may be defined as the order of processing from one node to the next node of the tree data structure. As each path is traversed, nodes of the tree data structure are intersected by the query data structure. Multiple intersected child nodes may require the tree traversal operation to be bifurcated. In other words, when more than one child node is intersected by the query data structure, the path may diverge. One technique for handling this divergence in processing is to utilize a stack data structure. However, limitations in the hardware architecture, such as a limited amount of memory available to store the stack data structure, may require the use of a short stack data structure, which is a stack data structure having a limited number of entries. As one path in the tree is taken from a particular node, other paths that are not taken may be stored in the short stack data structure, such as by storing a node (or a pointer to a node) in the stack data structure that represents the divergent path not immediately selected for processing. For example, when a particular node is processed in the tree traversal operation, two or more child nodes of the node may be tested for intersection with the query data structure. When the intersection test indicates that two or more child nodes are intersected by the query data structure, then traversal of the tree data structure must take two divergent paths. While the processing of the tree data structure is continued for one of the intersected child nodes, the other intersected child node(s) may be stored in the short stack data structure to be tested once the traversal of all of the nodes associated with the first intersected child node has been completed.

The nature of the short stack data structure allows for a temporary location to store state associated with the traversed path(s). Normally, with a full stack data structure implementation, when the stack data structure is empty, the traversal of the tree data structure is complete. However, with a short stack data structure implementation, a stack overflow event may occur if the number of elements pushed onto the short stack data structure at any given time exceeds the available number of entries included within the short stack data structure. Unlike a full stack data structure implementation, when the short stack data structure is empty, the traversal of the tree data structure may not be complete. Thus, a technique used with stack-less algorithms may be employed with the short stack algorithm described herein in order to overcome some deficiencies associated with using a short stack data structure.

It will be appreciated that the tree traversal operation described above may be configured to test each of the child nodes of a particular node for intersection with the query data structure (e.g., a ray, an AABB, etc.) before such child nodes are pushed onto the short stack data structure. In other words, only intersected child nodes are pushed onto the short stack data structure. However, in another embodiment, once a particular node is tested for intersection with the query data structure and is found to intersect the query data structure, each of the child nodes of the particular node may be pushed onto the short stack data structure regardless of whether the child nodes intersect the query data structure. In other words, child nodes of intersected nodes may be pushed onto the short stack data structure without first testing the child nodes for intersection with the query data structure, and the intersection test for each of the child nodes will then be performed at a later time when the child nodes are popped from the short stack data structure. Selection of one technique instead of another may be a design decision and both techniques are within the scope of the present disclosure.

At step 104, the processor determines whether the short stack data structure is empty. In one embodiment, while processing a particular node during the tree traversal operation, the node may be tested for intersection with the query data structure. If the node intersects the query data structure and is a leaf node, then the elements of the node may be tested for intersection with the query data structure and no other nodes are added to the short stack data structure. If the node intersects the query data structure and is an internal node (i.e., the node has one or more child nodes that descend from the node), then the child nodes of the current node may be added to the short stack data structure. If the node does not intersect the query data structure, then none of the child nodes of the current node are added to the short stack data structure. After the intersection test is complete and zero or more child nodes have been added to the short stack data structure, the state of the short stack data structure may be checked. If the short stack data structure is not empty, then the tree traversal operation may be continued for the next node in the short stack data structure. However, if the short stack data structure is empty, then that indicates that the current path being traversed has terminated and the path should be traced back along the parent nodes to find the next node in the tree data structure that needs to be tested, even though that node is not currently stored in the short stack data structure (i.e., the node may have been pushed onto the top of the short stack data structure at some previous time but was subsequently dropped from the bottom of the short stack data structure).

At step 106, a back-tracking operation is executed for a current node to identify a new node in the tree data structure to continue the tree traversal operation. The back-tracking operation may be executed by the processor that executes the tree traversal operation. In one embodiment, a parent node is identified that corresponds to the node currently being processed. The parent node is checked for additional child nodes that still need to be processed by the tree traversal operation. If the parent node includes at least one additional child node that still needs to be processed, then at least one additional child node is pushed onto the short stack data structure and the tree traversal operation is continued. However, if the parent node does not include at least one additional child node that has yet to be tested, then the back-tracking operation is repeated by ascending up the tree from the parent node to a second-level parent node of the parent node. That next parent node is tested in a similar fashion, and the next parent's parent node, and so on and so forth ascending up the tree data structure, until at least one additional child node that still needs to be processed is identified or the root node of the tree data structure is reached without identifying any additional nodes that need to be processed.

At step 108, the processor determines whether a new node in the tree data structure has been identified. If a new node has been identified by the back-tracking operation, then the method 100 returns to step 102 and the tree traversal operation is continued from the new node. However, if the back-tracking operation reaches the root node for the tree data structure without identifying any child nodes that still need to be processed by the tree traversal operation, then the tree traversal operation is complete and the method 100 terminates.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
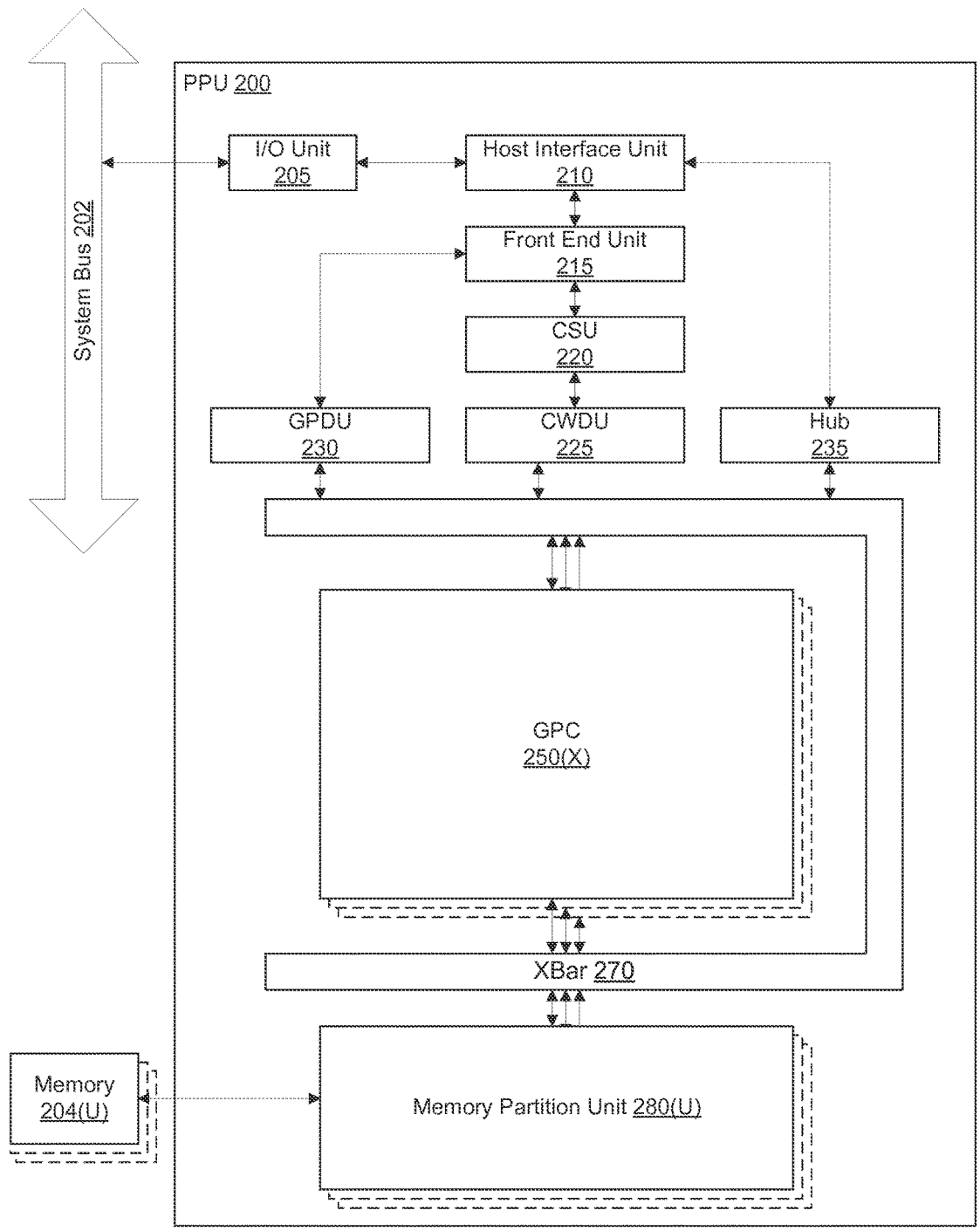
FIG. 2 illustrates a parallel processing unit, in accordance with one embodiment.

FIG. 2 illustrates a parallel processing unit (PPU) 200, in accordance with one embodiment. In one embodiment, the PPU 200 is a multi-threaded processor that is implemented on one or more integrated circuit devices. The PPU 200 is a latency hiding architecture designed to process a large number of threads in parallel. A thread (i.e., a thread of execution) is an instantiation of a set of instructions configured to be executed by the PPU 200. In one embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 2, the PPU 200 includes an Input/Output (1/O) unit 205, a host interface unit 210, a front end unit 215, a compute scheduler unit (CSU) 220, a compute work distribution unit (CWDU) 225, a graphics primitive distribution unit (GPDU) 230, a hub 235, a crossbar (Xbar) 270, one or more general processing clusters (GPCs) 250, and one or more memory partition units 280. The PPU 200 may be connected to a host processor or other peripheral devices via a system bus 202. The PPU 200 may also be connected to a local memory comprising a number of memory devices 204. In one embodiment, the local memory may comprise a number of dynamic random access memory (DRAM) devices.

The I/O unit 205 is configured to transmit and receive communications (i.e., commands, data, etc.) from a host processor (not shown) over the system bus 202. The I/O unit 205 may communicate with the host processor directly via the system bus 202 or through one or more intermediate devices such as a memory bridge. In one embodiment, the I/O unit 205 implements a Peripheral Component Interconnect Express (PCIe) interface for communications over a PCIe bus. In alternative embodiments, the I/O unit 205 may implement other types of well-known interfaces for communicating with external devices.

The I/O unit 205 is coupled to a host interface unit 210 that decodes packets received via the system bus 202. In one embodiment, the packets represent commands configured to cause the PPU 200 to perform various operations. The host interface unit 210 transmits the decoded commands to various other units of the PPU 200 as the commands may specify. For example, some commands may be transmitted to the front end unit 215. Other commands may be transmitted to the hub 235 or other units of the PPU 200 such as one or more copy engines, a video encoder, a video decoder, a power management unit, etc. (not explicitly shown). In other words, the host interface unit 210 is configured to route communications between and among the various logical units of the PPU 200.

In one embodiment, a program executed by the host processor encodes a command stream in a buffer that provides workloads to the PPU 200 for processing. A workload may comprise a number of instructions and pointers to data to be processed by those instructions. The buffer is a region in a memory that is accessible (i.e., read/write) by both the host processor and the PPU 200. For example, the host interface unit 210 may be configured to access the buffer in a system memory connected to the system bus 202 via memory requests transmitted over the system bus 202 by the I/O unit 205. In one embodiment, the host processor writes the command stream to the buffer and then transmits a pointer to the start of the command stream to the PPU 200. The host interface unit 210 manages the scheduling of instructions from one or more command streams written by the host processor (i.e., channels) on the various sub-units of the PPU 200.

The front end unit 215 receives instructions from the host interface unit 210 from one or more command streams and forwards those instructions to the correct sub-unit of the PPU 200. Instructions associated with a compute pipeline may be received by the front end unit 215. These compute instructions are then forwarded to a compute scheduler unit 220. The compute scheduler unit 220 is configured to track state information related to the various tasks managed by the compute scheduler unit 220. The state may indicate which GPC 250 a task is assigned to, whether the task is active or inactive, a priority level associated with the task, and so forth. The compute scheduler unit 220 manages the execution of a plurality of tasks on the one or more GPCs 250.

The compute scheduler unit 220 is coupled to a compute work distribution unit 225 that is configured to dispatch tasks for execution on the GPC's 250. The compute work distribution unit 225 may track a number of scheduled tasks received from the compute scheduler unit 220. In one embodiment, the compute work distribution unit 225 manages a pending task pool and an active task pool for each of the GPCs 250. The pending task pool may comprise a number of slots (e.g., 16 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

Returning to the front end unit 215, instructions associated with a graphics pipeline may be received by the front end unit 215. These graphics instructions are then forwarded to a graphics primitive distribution unit 230. The graphics primitive distribution unit 230 fetches vertex data from the memory 204 or the system memory via the system bus 202 for various graphics primitives. Graphics primitives may include points, lines, triangles, quads, triangle strips, and the like. The graphics primitive distribution unit 230 groups the vertices into batches of primitives and dispatches tasks to the GPCs 250 for processing the batches of primitives. Processing may involve executing a shader (i.e., a Vertex Shader, Tesselation Shader, Geometry Shader, etc.) on a programmable processing unit as well as performing fixed function operations on the vertices such as clipping, culling, and viewport transformation using a fixed function unit.

The compute work distribution unit 225 and the graphics primitive distribution unit 230 communicate with the one or more GPCs 250 via a XBar 270. The XBar 270 is an interconnect network that couples many of the units of the PPU 200 to other units of the PPU 200. For example, the XBar 270 may be configured to couple the compute work distribution unit 225 to a particular GPC 250. Although not shown explicitly, one or more other units of the PPU 200 are coupled to the host unit 210. The other units may also be connected to the XBar 270 via a hub 235.

The tasks associated with the compute pipeline are managed by the compute scheduler unit 220 and dispatched to a GPC 250 by the compute work distribution unit 225. The tasks associated with the graphics pipeline are managed and distributed to a GPC 250 by the graphics primitive distribution unit 230. The GPC 250 is configured to process the tasks and generate results. The results may be consumed by other tasks within the GPC 250, routed to a different GPC 250 via the XBar 270, or stored in the memory 204. The results can be written to the memory 204 via the memory partition units 280, which implement a memory interface for reading and writing data to/from the memory 204. In one embodiment, the PPU 200 includes a number U of memory partition units 280 that is equal to the number of separate and distinct memory devices 204 coupled to the PPU 200. A memory partition unit 280 will be described in more detail below in conjunction with FIG. 3B.

In one embodiment, a host processor executes a driver kernel that implements an application programming interface (API) that enables one or more applications executing on the host processor to schedule operations for execution on the PPU 200. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. A thread block may refer to a plurality of groups of threads including instructions to perform the task. Threads in the same thread block may exchange data through shared memory. In one embodiment, a warp comprises 32 related threads.

Figure 3A:
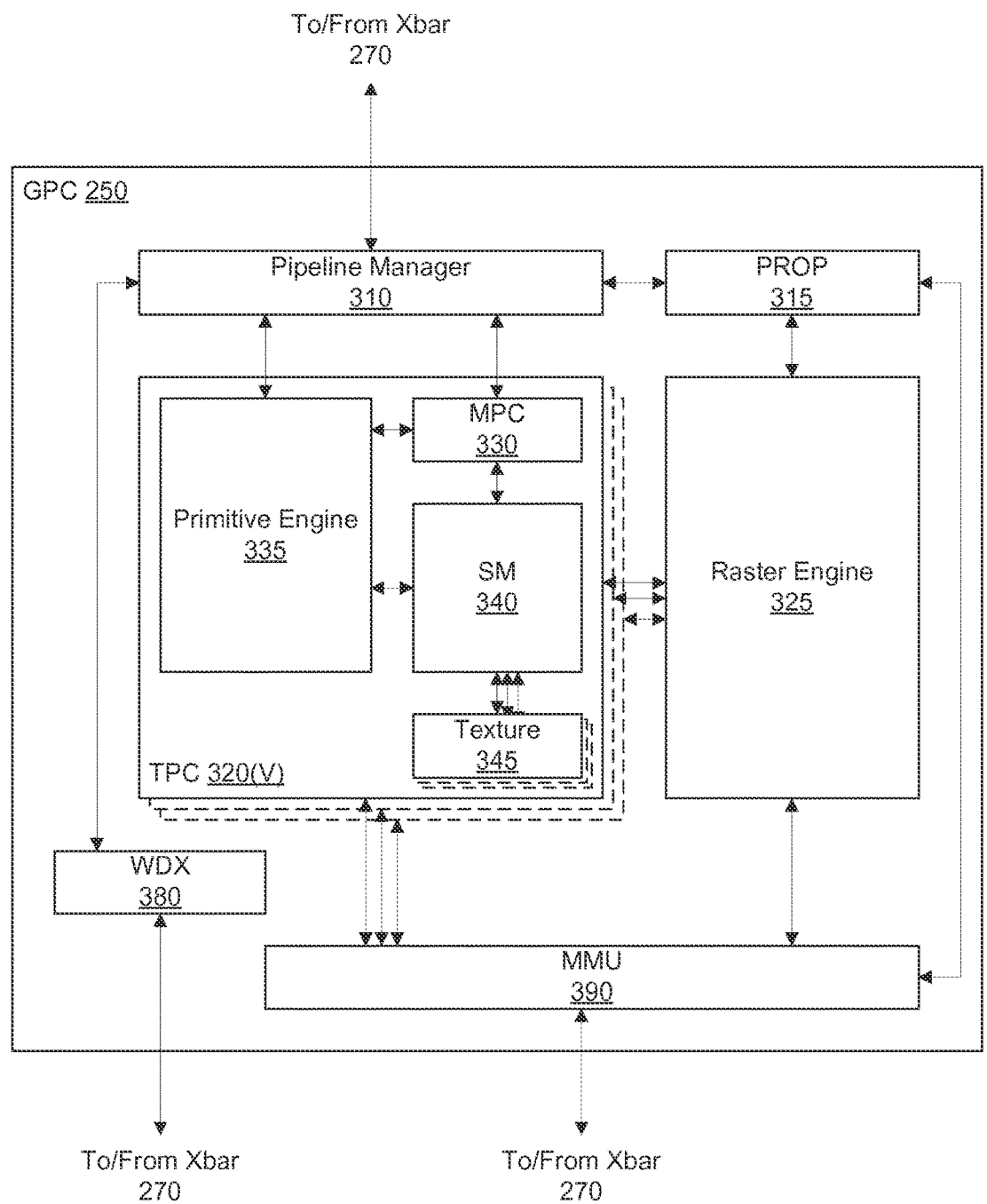
FIG. 3A illustrates a general processing cluster of the parallel processing unit of FIG. 2, in accordance with one embodiment.

FIG. 3A illustrates a GPC 250 of the PPU 200 of FIG. 2, in accordance with one embodiment. As shown in FIG. 3A, each GPC 250 includes a number of hardware units for processing tasks. In one embodiment, each GPC 250 includes a pipeline manager 310, a pre-raster operations unit (PROP) 315, a raster engine 325, a work distribution crossbar (WDX) 380, a memory management unit (MMU) 390, and one or more Texture Processing Clusters (TPCs) 320. It will be appreciated that the GPC 250 of FIG. 3A may include other hardware units in lieu of or in addition to the units shown in FIG. 3A.

In one embodiment, the operation of the GPC 250 is controlled by the pipeline manager 310. The pipeline manager 310 manages the configuration of the one or more TPCs 320 for processing tasks allocated to the GPC 250. In one embodiment, the pipeline manager 310 may configure at least one of the one or more TPCs 320 to implement at least a portion of a graphics rendering pipeline. For example, a TPC 320 may be configured to execute a vertex shader program on the programmable streaming multiprocessor (SM) 340. The pipeline manager 310 may also be configured to route packets received from the Xbar 270 to the appropriate logical units within the GPC 250. For example, some packets may be routed to fixed function hardware units in the PROP 315 and/or raster engine 325 while other packets may be routed to the TPCs 320 for processing by the primitive engine 335 or the SM 340.

The PROP unit 315 is configured to route data generated by the raster engine 325 and the TPCs 320 to a Raster Operations (ROP) unit in the memory partition unit 280, described in more detail below. The PROP unit 315 may also be configured to perform optimizations for color blending, organize pixel data, perform address translations, and the like.

The raster engine 325 includes a number of fixed function hardware units configured to perform various raster operations. In one embodiment, the raster engine 325 includes a setup engine, a coarse raster engine, a culling engine, a clipping engine, a fine raster engine, and a tile coalescing engine. Primitives lying outside a viewing frustrum may be clipped by the clipping engine. The setup engine receives transformed vertices that lie within the viewing plane and generates plane equations associated with the geometric primitive defined by the vertices. The plane equations are transmitted to the coarse raster engine to generate coverage information (e.g., an x,y coverage mask for a tile) for the primitive. The output of the coarse raster engine may be transmitted to the culling engine where fragments associated with the primitive that fail a z-test are culled. Those fragments that survive culling may be passed to a fine raster engine to generate attributes for the pixel fragments based on the plane equations generated by the setup engine. The output of the raster engine 380 comprises fragments to be processed, for example, by a fragment shader implemented within a TPC 320.

Each TPC 320 included in the GPC 250 includes an M-Pipe Controller (MPC) 330, a primitive engine 335, an SM 340, and one or more texture units 345. The MPC 330 controls the operation of the TPC 320, routing packets received from the pipeline manager 310 to the appropriate units in the TPC 320. For example, packets associated with a vertex may be routed to the primitive engine 335, which is configured to fetch vertex attributes associated with the vertex from the memory 204. In contrast, packets associated with a shader program may be transmitted to the SM 340.

In one embodiment, the texture units 345 are configured to load texture maps (e.g., a 2D array of texels) from the memory 204 and sample the texture maps to produce sampled texture values for use in shader programs executed by the SM 340. The texture units 345 implement texture operations such as filtering operations using mip-maps (i.e., texture maps of varying levels of detail). In one embodiment, each TPC 320 includes two (2) texture units 345.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In one embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 340 may be described in more detail below in conjunction with FIG. 4.

The MMU 390 provides an interface between the GPC 250 and the memory partition unit 280. The MMU 390 may provide translation of virtual addresses into physical addresses, memory protection, and arbitration of memory requests. In one embodiment, the MMU 390 provides one or more translation lookaside buffers (TLBs) for improving translation of virtual addresses into physical addresses in the memory 204.

Figure 3B:
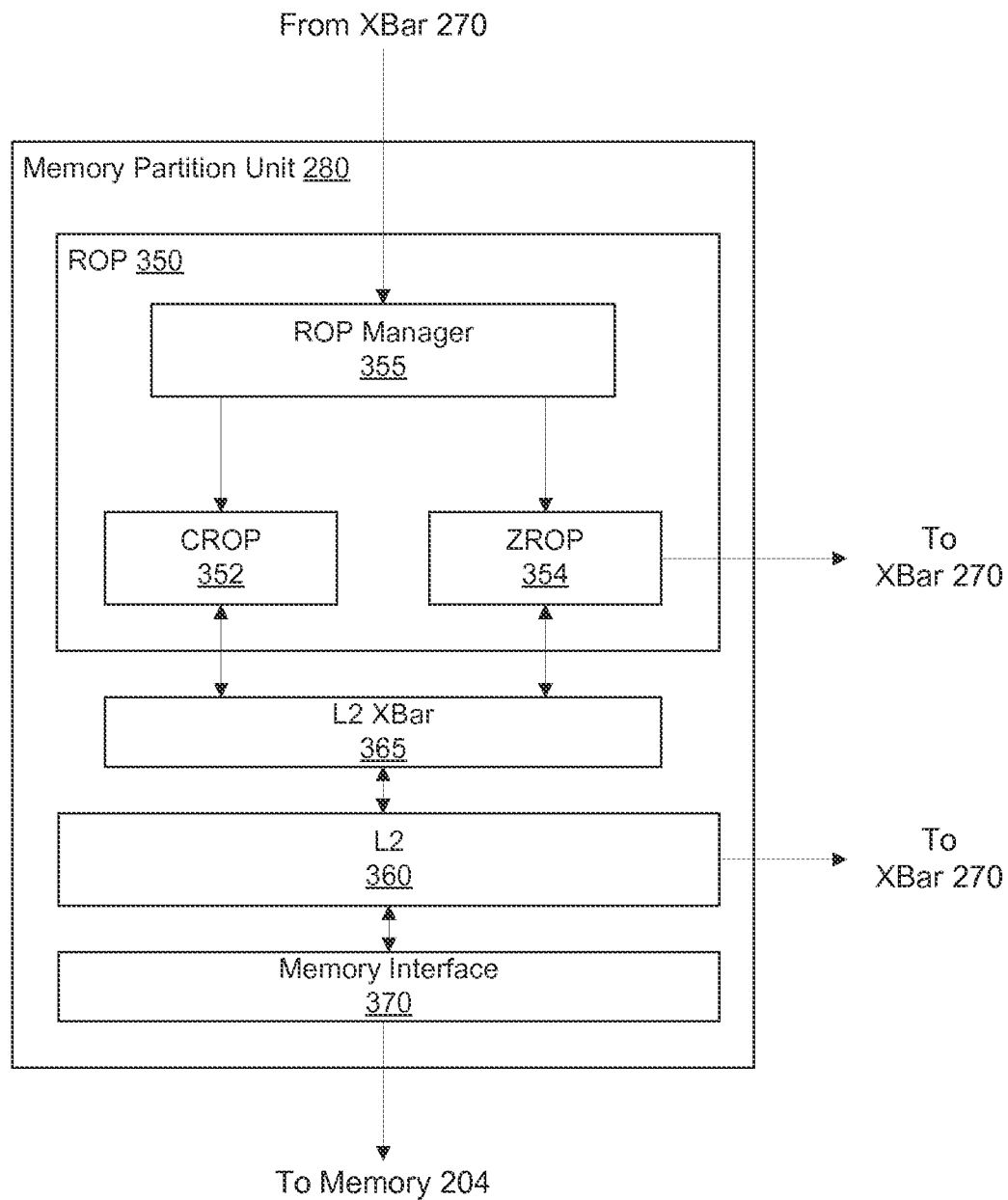
FIG. 3B illustrates a partition unit of the parallel processing unit of FIG. 2, in accordance with one embodiment.

FIG. 3B illustrates a memory partition unit 280 of the PPU 200 of FIG. 2, in accordance with one embodiment. As shown in FIG. 3B, the memory partition unit 280 includes a Raster Operations (ROP) unit 350, a level two (L2) cache 360, a memory interface 370, and an L2 crossbar (XBar) 365. The memory interface 370 is coupled to the memory 204. Memory interface 370 may implement 16, 32, 64, 128-bit data buses, or the like, for high-speed data transfer. In one embodiment, the PPU 200 comprises U memory interfaces 370, one memory interface 370 per memory partition unit 280, where each memory partition unit 280 is connected to a corresponding memory device 204. For example, PPU 200 may be connected to up to U memory devices 204, such as graphics double-data-rate, version 5, synchronous dynamic random access memory (GDDR5 SDRAM). In one embodiment, the memory interface 370 implements a DRAM interface and U is equal to 6.

In one embodiment, the PPU 200 implements a multi-level memory hierarchy. The memory 204 is located off-chip in SDRAM coupled to the PPU 200. Data from the memory 204 may be fetched and stored in the L2 cache 360, which is located on-chip and is shared between the various GPCs 250. As shown, each memory partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 includes a ROP Manager 355, a Color ROP (CROP) unit 352, and a Z ROP (ZROP) unit 354. The CROP unit 352 performs raster operations related to pixel color, such as color compression, pixel blending, and the like. The ZROP unit 354 implements depth testing in conjunction with the raster engine 325. The ZROP unit 354 receives a depth for a sample location associated with a pixel fragment from the culling engine of the raster engine 325. The ZROP unit 354 tests the depth against a corresponding depth in a depth buffer for a sample location associated with the fragment. If the fragment passes the depth test for the sample location, then the ZROP unit 354 updates the depth buffer and transmits a result of the depth test to the raster engine 325. The ROP Manager 355 controls the operation of the ROP unit 350. It will be appreciated that the number of memory partition units 280 may be different than the number of GPCs 250 and, therefore, each ROP unit 350 may be coupled to each of the GPCs 250. Therefore, the ROP Manager 355 tracks packets received from the different GPCs 250 and determines which GPC 250 that a result generated by the ROP unit 350 is routed to. The CROP unit 352 and the ZROP unit 354 are coupled to the L2 cache 360 via an L2 XBar 365.

Figure 4:
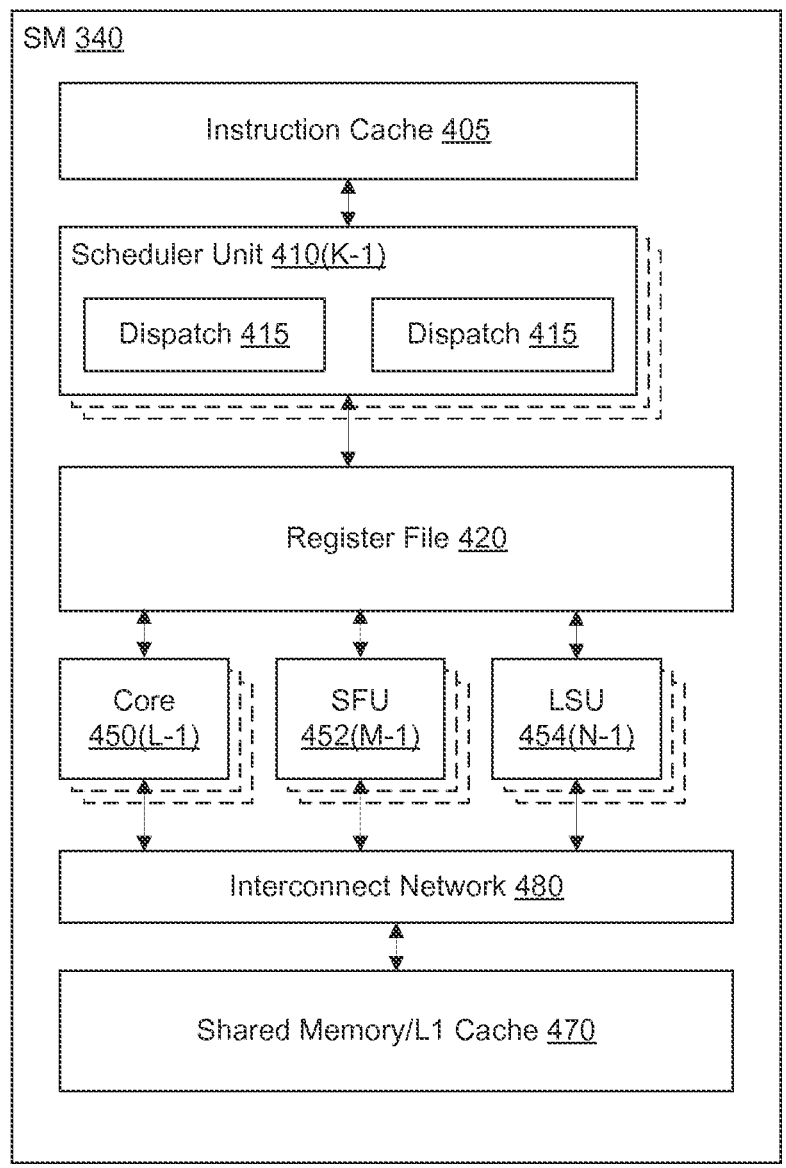
FIG. 4 illustrates the streaming multi-processor of FIG. 3A, in accordance with one embodiment.

FIG. 4 illustrates the streaming multi-processor 340 of FIG. 3A, in accordance with one embodiment. As shown in FIG. 4, the SM 340 includes an instruction cache 405, one or more scheduler units 410, a register file 420, one or more processing cores 450, one or more special function units (SFUs) 452, one or more load/store units (LSUs) 454, an interconnect network 480, and a shared memory/L1 cache 470.

As described above, the compute work distribution unit 225 and the graphics primitive distribution unit 230 dispatch tasks for execution on the GPCs 250 of the PPU 200. The tasks are allocated to a particular TPC 320 within a GPC 250 and, if the task is associated with a shader program, the task may be allocated to an SM 340. A scheduler unit 410 receives the tasks from the compute work distribution unit 225 and the graphics primitive distribution unit 230 and manages instruction scheduling for one or more groups of threads (i.e., warps) assigned to the SM 340. Each SM 340 may include K scheduler units 410 (i.e., 410(0) . . . 410(K−1)). The scheduler unit 410 schedules threads for execution in groups of parallel threads, where each group is called a warp. In one embodiment, each warp includes 32 threads. The scheduler unit 410 may manage a plurality of different warps, scheduling the warps for execution and then dispatching instructions from the plurality of different warps to the various functional units (i.e., cores 350, SFUs 352, and LSUs 354) during each clock cycle.

In one embodiment, each scheduler unit 410 includes one or more instruction dispatch units 415. Each dispatch unit 415 is configured to transmit instructions to one or more of the functional units. In the embodiment shown in FIG. 4, the scheduler unit 410 includes two dispatch units 415 that enable two different instructions from the same warp to be dispatched during each clock cycle. In alternative embodiments, each scheduler unit 410 may include a single dispatch unit 415 or additional dispatch units 415.

Each SM 340 includes a register file 420 that provides a set of registers for the functional units of the SM 340. In one embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450 (i.e., 450(0) . . . 450(L−1)). In one embodiment, the SM 340 includes a large number (e.g., 192, etc.) of distinct processing cores 450. Each core 450 may include a fully-pipelined, single-precision processing unit that includes a floating point arithmetic logic unit and an integer arithmetic logic unit. The core 450 may also include a double-precision processing unit including a floating point arithmetic logic unit. In one embodiment, the floating point arithmetic logic units implement the IEEE 754-2008 standard for floating point arithmetic. Each SM 340 also comprises M SFUs 452 (i.e., 452(0) . . . 452(M−1)) that perform special functions (e.g., transcendental function evaluation, attribute interpolation, and the like), N LSUs 454 (i.e., 454(0) . . . 454(N−1)) that implement load and store operations between the shared memory/L1 cache 470 and the register file 420, and O TTUs 500 (i.e., 500(0) . . . 500(O−1)) that implement tree traversal operations (e.g., intersecting a ray with a bounding volume hierarchy, etc.). In one embodiment, the SM 340 includes 192 cores 450, 32 SFUs 452, and 32 LSUs 454, and one TTU 500.

Each SM 340 includes an interconnect network 480 that connects each of the functional units to the register file 420 and the shared memory/L1 cache 470. In one embodiment, the interconnect network 480 is a crossbar that can be configured to connect any of the functional units to any of the registers in the register file 420 or the memory locations in shared memory/L1 cache 470.

The shared memory/L cache 470 is an array of on-chip memory that, in one embodiment, may be configured as either shared memory or an L cache, or a combination of both, as the application demands. For example, the shared memory/L1 cache 470 may comprise 64 kB of storage capacity. The shared memory/L1 cache 470 may be configured as 64 kB of either shared memory or L1 cache, or a combination of the two such as 16 kB of L cache and 48 kB of shared memory.

The PPU 200 described above may be configured to perform highly parallel computations much faster than conventional CPUs. Parallel computing has advantages in graphics processing, data compression, biometrics, stream processing algorithms, and the like.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be executed on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In one embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Tree Traversal Unit

Figure 5A:
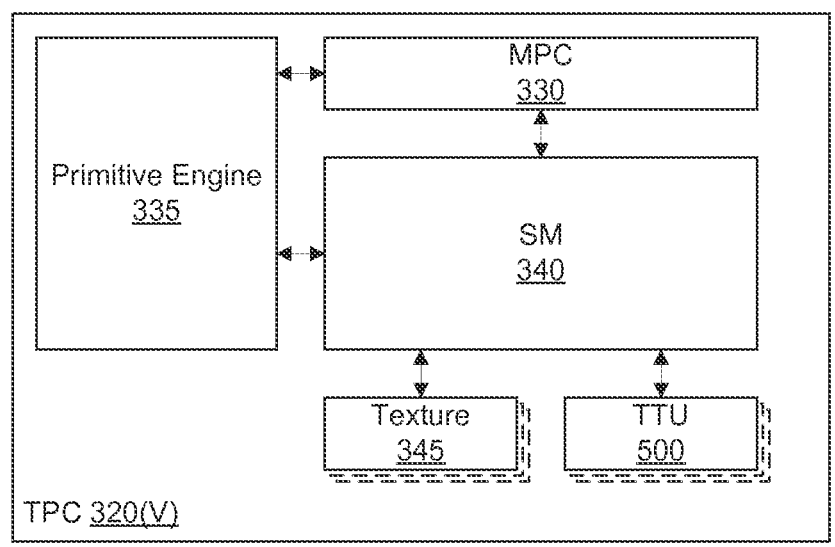
FIG. 5A illustrates a texture processing cluster of FIG. 3A, modified to include one or more tree traversal units, in accordance with one embodiment.

FIG. 5A illustrates a TPC 320 of FIG. 3A, modified to include one or more tree traversal units (TTUs) 500, in accordance with one embodiment. The TTUs 500 are each configured to perform tree traversal operations. Tree traversal operations are commonly utilized in, for example, ray tracing algorithms in computer graphics. However, the TTUs 500 may be optimized for general tree traversal operations and are not limited, specifically, to ray tracing techniques.

In one embodiment, each TPC 320 included in the PPU 200 may include one or more TTUs 500 for performing tree traversal operations. The TTUs 500 are coupled to the SM 340 similar to the texture units 345. It will be appreciated, that in alternate embodiments, the TTUs 500 may be included in the SM 340 similar to the cores 450 or the SFUs 452. Alternately, one or more TTUs 500 may be implemented within the PPU 200 and shared by one or more GPCs 250 or one or more SMs 340.

A tree traversal operation may include any operation performed by traversing the nodes of a tree data structure. A tree data structure may include, but is not limited to, a binary tree, an octree, a four-ary tree, a k-d tree, a binary space partitioning (BSP) tree, and a bounding volume hierarchy (BVH) tree. In one embodiment, the tree traversal operation includes a number of instructions for intersection a query shape with the tree. The query shapes may be, e.g., rays, bounding boxes, frustrums, cones, spheres, and the like. In various embodiments, a query shape may be specified by a query data structure. The query data structure may include any technically feasible technique for specifying the query shape to intersect with the tree. For example, the query data structure may specify the starting and ending points of a ray using two three-coordinate vectors. In another example, the query data structure may specify the six planes of an axis-aligned bounding box using six 32-bit floating point coordinates. The various query data structures may include any number of fields for specifying the attributes of the query shape.

For example, one type of tree traversal operation for which the TTU 500 may be optimized is to intersect a ray with a BVH data structure that represents each of the geometric primitives in a 3D scene or 3D model. The TTU 500 may be particularly useful in ray-tracing applications in which millions or even billions of rays are intersected with the geometric primitives of a 3D model represented by a BVH data structure.

Figure 5B:
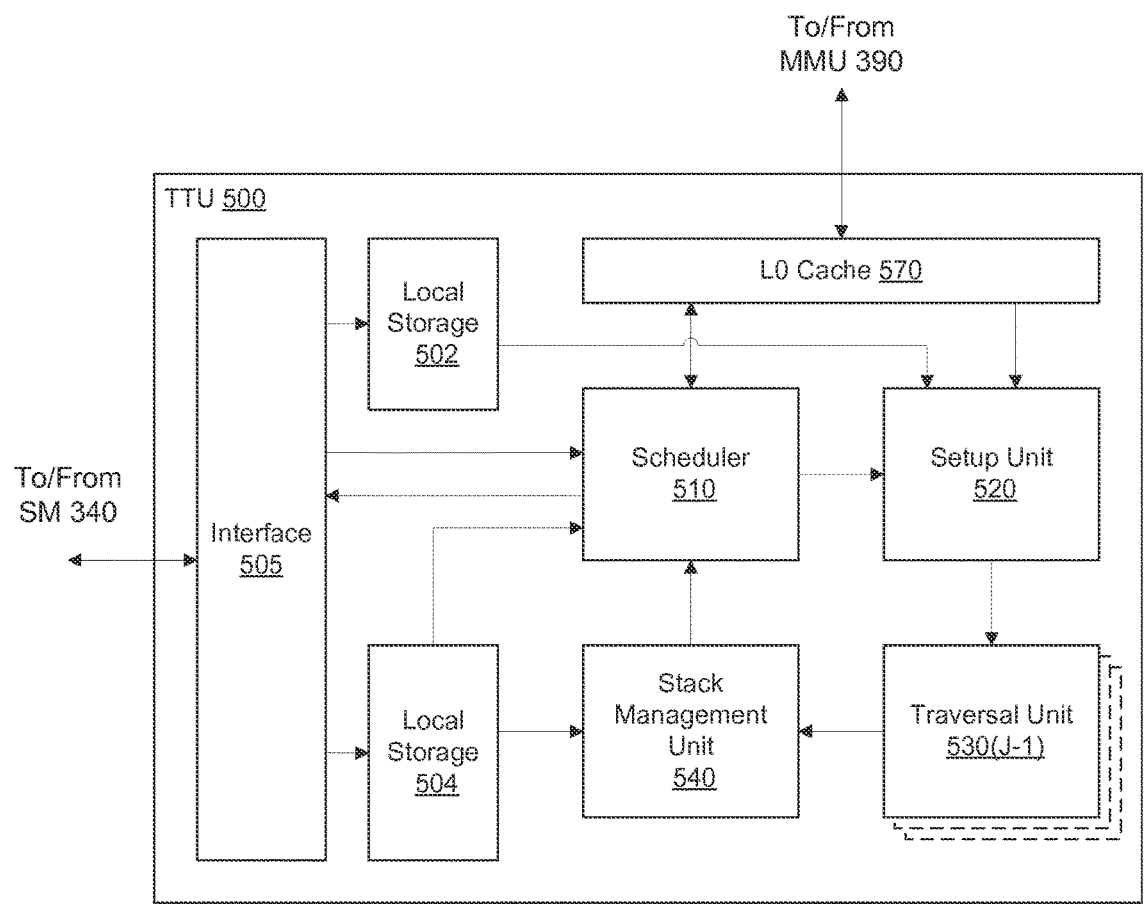
FIG. 5B illustrates a tree traversal unit of FIG. 5A, in accordance with one embodiment.

FIG. 5B illustrates a TTU 500 of FIG. 5A, in accordance with one embodiment. As shown in FIG. 5B, the TTU 500 includes an interface 505, a scheduler unit 510, a setup unit 520, one or more traversal units 530, and a stack management unit 540. The TTU 500 also includes a level-zero (L0) cache unit 570 coupled to a memory architecture hierarchy including one or more L2 caches 360 and memory units 204 via the MMU 390. The TTU 500 also includes local storage 502 for a plurality of query data structures and local storage 504 for a plurality of stack data structures. The local storage 502 and the local storage 504 may be, e.g., static RAM, a latch array, a register file, or the like. It will be appreciated that the TTU 500 may include other hardware units in addition to or in lieu of the hardware units shown in FIG. 5B.

The interface 505 may receive instructions and/or data for performing tree traversal operations from the SM 340. In one embodiment, the SM 340 may transmit the instructions and/or data directly to the interface 505 via a plurality of dedicated interconnects (e.g., wires, paths in a metal layer of a semiconductor, etc.). In another embodiment, the SM 340 may write the instructions to one or more special registers associated with the TTU 500, and the interface 505 may monitor the registers for any updates from the SM 340.

The instructions may include instructions for configuring the TTU 500 to perform a tree traversal operation. The instructions may include operands such as pointers that direct the TTU 500 to a tree data structure and/or a query data structure are located in the memory 204. The interface 505 may cause, at least a portion of, the tree data structure and/or the query data structure to be fetched into the L0 cache unit 570 or the local storage 502.

The L0 cache unit 570 is coupled to the MMU 390 and provides a low-level, local access to the memory architecture hierarchy of the PPU 200. In one embodiment, the L0 cache unit 570 includes a number of entries, where each entry is sized according to a size of a cache line in the memory architecture hierarchy. For example, the L2 cache 360 associated with the memory 204 may implement a cache line having L bytes of information, and the L0 cache unit 570 may include M entries of L bytes to enable up to M cache lines to be stored in the L0 cache unit 570. In one embodiment, the L0 cache unit 570 may include eight entries for cache lines having 128 bytes of data. Of course, the size and number of entries in the L0 cache unit 570 may vary widely between different architectures and other cache line sizes and number of entries are contemplated as being within the scope of various embodiments. Furthermore, the L0 cache unit 570 may include logic in addition to the raw data storage for fetching cache lines from the memory 204 and/or the other hierarchical cache units. For example, the logic may include hardware configured to select particular entries in the L0 cache unit 570 to evict in order to enable other data to be fetched into the L0 cache unit 570. The logic may also include hardware for maintaining cache coherency. For example, the logic may determine when write-back operations need to be performed for dirty cache lines.

In one embodiment, the query data structure associated with a particular tree traversal operation is stored in the local storage 502. The query data structure may specify a query shape to be intersected with a tree data structure. The interface 505 may receive the data for the query data structure and store the data in an available memory location in the local storage 502. The interface 505 may also initialize a stack data structure associated with the query data structure in the local storage 504. The stack data structure may include a portion of memory for creating a stack associated with the particular tree traversal operation. In one embodiment, the stack data structure is initialized by allocating a portion of the local storage 504 to a particular tree traversal operation and pushing a root node for a tree data structure onto the stack data structure. It will be appreciated that pushing a root node onto the stack data structure may be performed by storing a pointer to a data structure for the root node of the tree data structure in a memory location associated with the stack data structure.

The interface 505 may notify the scheduler 510 of an event when the interface 505 receives an instruction that causes a tree traversal operation to be launched by the TTU 500. The event may indicate that the TTU 500 has been tasked with performing a tree traversal operation for a particular tree data structure and a particular query data structure. The scheduler 510 may receive notice of the event via a signal. The signal may be a token that is passed to the scheduler 510 via a data communication channel. The token may include an identifier associated with a particular query data structure stored in the local storage 502.

The scheduler 510 may include a queue (e.g., first-in, first-out or FIFO, etc.) that includes a number of slots that store identifiers for query data structures associated with tree traversal operations. Identifiers may be unique within the scope of the TTU 500. In other words, each identifier uniquely identifies a particular query data structure stored in the local storage 502. In one embodiment, identifiers are allocated to query data structures dynamically when the query data structures are stored in the local storage 502. The queue may be used such that a number of different tree traversal operations may be in-flight in the TTU 500 at any given time, and the queue may be implemented, at least in part, to hide the latency associated with memory operations for fetching node data from the memory 204 into the L0 cache unit 570. In one embodiment, the queue includes, e.g., 32 slots for storing a number of identifiers for query data structures to be intersected with the tree data structure. The total number of slots may be increased or decreased to reduce latency associated with memory operations, which may be dependent, at least in part, on the details of the memory architecture hierarchy.

The scheduler 510 may also maintain scoreboards for tracking the status of the tree traversal operations associated with each of the query data structures referenced by identifiers stored in the queue. The scoreboards may indicate, for example, a scheduling priority for a particular tree traversal operation, whether data associated with the next node to be tested in the tree traversal operation is currently stored in the L0 cache unit 570, whether the tree traversal operation associated with a particular query data structure is currently being processed by the one or more traversal units 530, or whether results for a particular tree traversal operation are available in the memory 204. The scheduler 510 may also notify the SM 340, via the interface 505, of certain events, such as notifying the SM 340 that the data for a particular tree traversal operation is available in the memory 204 or in the register file 420 of the SM 340, or notifying the SM 340 that the queue in the scheduler 510 is full.

Once the scheduler 510 has received an event notification from the interface 505 indicating that the tree traversal operation should be launched, the scheduler 510 may begin to manage the execution of the tree traversal operation. In one embodiment, the scheduler 510 may pop the top element from the stack data structure in the local storage 504 associated with the tree traversal operation. The top element may include a pointer to a location of a node of the tree data structure in the memory 204. The scheduler 510 may issue one or more fetch commands to the L0 cache unit 570 to fetch data associated with the node into the L0 cache unit 570. The fetch commands may include an address of the data to be fetched. For example, the address may point to a root node for a block of the tree data structure. The L0 cache unit 570 will determine if the requested data is in the L0 cache unit 570. If the data is not currently stored in the L0 cache unit 570, then the fetch request results in a cache miss and the data will be fetched from the memory architecture hierarchy, such as L2 cache unit 360 or memory 204, as required. Once the data has been returned from the memory architecture hierarchy, the L0 cache unit 570 will inform the scheduler 510 that the data is available. If the data is currently stored in the L0 cache unit 570, then the fetch request results in a cache hit and the L0 cache unit 570 will inform the scheduler 510 that the data is immediately available. It will be appreciated that the data associated with a particular node may be included in data associated with a plurality of nodes of the tree data structure that are stored in contiguous memory and comprise a single cache line. Therefore, each fetch request may result in data for more than one node being loaded into the L0 cache unit 570.

Once the data has been fetched into the L0 cache unit 570, the scheduler 510 transmits a request to the setup unit 520 to initiate the tree traversal operation for one or more nodes of the tree data structure. The setup unit 520 may perform any number of operations for configuring the one or more traversal units 530 to perform the tree traversal operation. For example, in one embodiment, the setup unit 520 may fetch the data associated with the query data structure and the data associated with one or more nodes of the tree data structure from the local storage 502 and the L0 cache unit 570, respectively. In another embodiment, the setup unit 520 may transform coordinates associated with the query data structure from a global coordinate system into a local coordinate system. In another embodiment, the setup unit 520 may configure one or more traversal units 530 to execute instructions for performing the tree traversal operation for one or more nodes of the tree data structure.

In one embodiment, the TTU 500 is configured to perform tree traversal operations on blocks of a tree data structure. As used herein, a block may include one or more nodes of the tree data structure that fit within a particular cache line. The block may include a block root node having zero or more child nodes that are also included in the block. Each of the zero or more child nodes may also include corresponding child nodes, those corresponding child nodes may include one or more additional child nodes, and so forth. Some or all of the corresponding child nodes and/or the additional child nodes may also be included in the block. A block may be defined as no larger than a cache line (e.g., 128 bytes, etc.) and may contain a fixed or variable number of nodes. It will be appreciated that the tree data structure may include a plurality of blocks that together represent all of the nodes in the tree data structure.

The one or more traversal units 530 may receive data for a particular query data structure to intersect with one or more nodes of the tree data structure. Each traversal unit 530 may be configured to test each of the child nodes of a particular node for intersection with the query data structure. If the query data structure intersects the child node, then the child node is added to a local stack data structure. Once all of the child nodes of the particular node have been tested, then the traversal unit 530 may be configured to check the local stack data structure. If the local stack data structure is empty, then no nodes need to be tested for intersection with the query data structure, and the traversal unit 530 may notify the stack management unit 540 that the tree traversal operation has been completed, at least for the nodes in that particular block of the tree data structure. However, if the local stack data structure is not empty, then the top element is popped from the local stack data structure and the process is repeated for this new node.

If a particular node being tested by the traversal unit 530 is a leaf node and is intersected by the query data structure, then the elements associated with the leaf node may be added to a result queue. If the particular node being tested by the traversal unit 530 is an internal node that is included in another block of the tree data structure, then the node included in the other block may be added to a result queue.

In one embodiment, the traversal units 530 may implement a pipelined architecture in order to hide latency associated with a particular operation performed for each node. For example, a pipelined architecture may be implemented for an intersection test that takes a number of cycles to complete such that a number of intersection tests for different nodes and different query data structures may be in flight at any given time within a traversal unit 530. In other words, each traversal unit 530 may be performing tree traversal operations for a number of different nodes and a number of different query data structures substantially simultaneously.

In one embodiment, each traversal unit 530 includes a local storage for storing a number of different blocks of the tree data structure. The local storage may be a temporary location comprising static RAM for storing one or more cache lines included in the L0 cache unit 570 and needed for performing a tree traversal operation for a particular query data structure. For example, the local storage may include 5 slots of 128 bytes for storing up to five cache lines from the L0 cache unit 570 that include data for up to five different blocks of the tree data structure (or different tree data structures). The data in up to four of the slots in the local storage may be accessed by the logic of the traversal unit 530 during any given clock cycle, and data for the remaining slot may be written to the local storage by the setup unit 520 during the clock cycle. Each traversal unit 530 may also include local storage for storing a number of query data structures. The number of query data structures stored locally in the traversal unit 530 may be equal to the number of available slots for storing blocks of the tree data structure. Similarly, each traversal unit 530 may include local storage for storing a number of local stack data structures used for traversing the different blocks of the tree data structure.

The stack management unit 540 receives the results of a tree traversal operation from the result queue. The result queue may include leaf data such as a geometric primitive to be tested for intersection with a query shape as well as nodes (or rather pointers to nodes) included in other blocks of the tree data structure. In one embodiment, the stack management unit 540 transmits leaf data such as the geometric primitives to the SM 340. As described herein, the leaf data may represent those elements stored in the tree data structure that are potentially intersected by the query data structure. The SM 340 may be configured to process the results of the tree traversal operation by any means necessary. For example, if the results of the tree traversal operation include a set of geometric primitives, the SM 340 may be configured to test those particular geometric primitives for intersection with the query data structure. It will be appreciated that testing a geometric primitive included in a leaf node, such as a triangle or quad, for intersection with the query data structure is a different type of operation than testing a leaf node, associated with a bounding volume, for intersection with the query data structure. The SM 340 may also be configured to launch one or more additional tree traversal operations for new query data structures based on the processing of the geometric primitives included in the results.

The stack management unit 540 may also manage traversal stacks for each of the tree traversal operations currently being executed by the TTU 500. A traversal stack may refer to a data structure that temporarily stores particular nodes in the tree data structure that need to be tested against the query data structure during future iterations of the processing loop. A non-empty traversal stack that includes one or more nodes of the tree data structure indicates that at least a portion of the tree traversal operation still needs to be scheduled for execution by the one or more traversal units 530.

When the stack management unit 540 receives a pointer to a node for a new block of the tree data structure in the result queue, the stack management unit 540 adds the node to the traversal stack for a particular tree traversal operation. The stack management unit 540 may be notified once the one or more traversal units 530 have completed testing the nodes of a given block of the tree data structure. In one embodiment, the one or more traversal units 530 may notify the stack management unit 540 of an event by including a signal and/or data in the result queue that indicates the one or more traversal units 530 have completed executing the tree traversal operation for a block of the tree data structure. Once the stack management unit 540 reads the event from the result queue, the stack management unit 540 may cause the scheduler 510 to initiate the next portion of the tree traversal operation for a different block associated with a node included in the traversal stack. In other words, the scheduler unit 510 may retrieve the top element (i.e., a new node) from the traversal stack included in the local storage 504, fetch any data required for performing the tree traversal operation for the new node into the L0 cache unit 570 and/or local storage 502, and notify the setup unit 520 to configure the one or more traversal units 530 to perform the tree traversal operation for one or more nodes in the new block of the tree data structure.

Although the TTU 500 described above has been described relative to a tree traversal operation for a general query data structure as applied to a general tree data structure, the TTU 500, in some embodiments, may be configured to perform a tree traversal operation for a specific application, such as ray-tracing. In other words, a tree traversal operation may be limited to intersecting a ray with a tree that represents a plurality of geometric primitives. The tree may be implemented as a bounding volume hierarchy (BVH), spatial subdivision tree, and the like. The operation of the TTU 500 as applied to a ray-tracing application in association with a BVH will be described in more detail below.

In order to intersect a ray with the BVH, the SM 340 may transmit an instruction to the interface 505 of the TTU 500. In response to the instruction, the interface 505 may load a ray data structure into the local storage 502 and initialize a traversal stack data structure in the local storage 504. The interface 505 may also push a root node for the BVH onto the traversal stack data structure. The interface 505 may also assign a ray identifier to the ray data structure in the local storage 502 for identifying the particular ray data structure associated with a particular tree traversal operation. In a typical ray-tracing algorithm utilized to create a computer generated image, hundreds, thousands, or even millions of rays may be cast and intersected with the tree data structure. Thus, the ray identifier provides a useful way for tracking and identifying a tree traversal operation in flight in the TTU 500 for a particular ray.

The ray data structure may be stored in the local storage 502 such that the ray data structure may be quickly accessed during the tree traversal operation associated with the ray. A ray may be defined, e.g., by a set of tuples specifying a starting coordinate and an ending coordinate, or, alternately, a starting coordinate, a direction, and a magnitude. The ray data structure may include one or more coordinates for specifying the ray, one or more attributes of the ray, and so forth. In one embodiment, the ray data structure includes two vectors for specifying the endpoints of the ray, each vector comprising three 32-bit floating point values for specifying the coordinates of a point relative to a global coordinate system, as well as one or more attributes such as color information and the like.

The interface 505 may notify the scheduler 510 of a ray event that indicates that the TTU 500 received an instruction requesting a tree traversal operation to be performed for a given ray data structure. The interface 505 may pass a ray identifier for the ray data structure stored in the local storage 502 to the scheduler 510 as part of the ray event.

As long as the queue includes at least one ray identifier that needs to be processed by the one or more traversal units 530, the scheduler 510 may choose a particular tree traversal operation from the queue to be launched on the one or more traversal units 530. The particular tree traversal operation may be selected by selecting one of the ray identifiers included in the queue of the scheduler 510. Any technically feasible means for selecting a particular ray identifier from the queue may be implemented by the scheduler 510, such as a priority-based algorithm, a round-robin algorithm, and the like.

In one embodiment, the scheduler 510 searches the queue for ray identifiers that are ready to be launched. The scheduler 510 may select a particular ray identifier ready to be launched and fetch the top element from the traversal stack data structure corresponding to the ray identifier. The top element may comprise a pointer to a node of the BVH. The scheduler 510 may then issue a fetch request to the L0 cache unit 570 to fetch the data corresponding to the pointer to the node. If the data is not currently stored in the L0 cache unit 570, then the data is fetched from memory and the scheduler 510, during the next clock cycle, may select another ray identifier from the queue to try and launch. However, if the data is currently stored in the L0 cache unit 570, then the scheduler 510 transmits a request to the setup unit 520 to launch the tree traversal operation for that node.

In one embodiment, the node represents the root node for a block of the BVH. The setup unit 520 and one or more traversal units 530 will be configured to traverse all of the nodes of the block, intersecting each node of the block with the ray data structure corresponding to that particular tree traversal operation. In one embodiment, the setup unit 520 fetches the ray data structure associated with the tree traversal operation from the local storage 502. The setup unit 520 may also fetch the data for the block including the node from the L0 cache unit 570. In one embodiment, the setup unit 520 performs one or more operations for preparing to execute the tree traversal operation. For example, in one embodiment, the setup unit 520 transforms the coordinates associated with the ray data structure from a global coordinate system to a local coordinate system associated with a root node of the block. In another embodiment, the setup unit 520 may test the root node for the block for intersection with the ray data structure. If the root node for the block intersects the ray data structure then each of the child nodes of the root node may be passed to a particular tree traversal unit 530 to continue traversing the BVH in parallel. In one embodiment, the TTU 500 may include four traversal units 530 to test up to four child nodes for intersection with the ray in parallel. The number of traversal units 530 that are implemented in a given TTU 500 may be optimized for the types of trees that are typically traversed. In yet another embodiment, the setup unit 520 may transmit the root node for the block to one of the available tree traversal units 530.

When a node is received at a tree traversal unit 530 from the setup unit 520, the node is inserted into a local stack data structure. The local stack data structure is similar to the traversal stack data structure except the depth of the local stack data structure may be limited due to the fixed size of a block of the tree data structure. The traversal unit 530 then enters a loop where the traversal unit 530 determines if the local stack data structure is empty. If the local stack data structure is empty, then the traversal unit 530 has completed the traversal of the block. However, if the local stack data structure is not empty, then the traversal unit 530 pops the top entry from the local stack data structure. If the top entry is a leaf node and the lead node intersects the ray data structure, then the data (e.g., a geometric primitive) stored in the leaf node is added to a result queue. However, if the top entry is an internal node (i.e., a node that includes one or more child nodes, etc.), then the ray data structure is intersected with the node to determine if the ray intersects the node. If the ray data structure does not intersect the node, then nothing is added to the local stack data structure, and the loop is repeated if the local stack data structure is not empty. If the ray data structure intersects the node, then each of the child nodes of the node included in the block are added to the local stack data structure and the loop is repeated. However, if the child nodes of the intersected node are not included in the block (i.e., the child nodes are included in a different block of the tree data structure, etc.), then the child nodes may be added to the result queue. Once the local stack data structure is empty, the tree traversal operation for the block is complete and any data included in the result queue may be passed to the stack management unit 540.

The stack management unit 540 may read the result queue and update the traversal stack data structure in the local storage 504 by adding any child nodes included in the result queue to the top of the traversal stack data structure. The stack management unit 540 may also transmit any geometric primitives included in the result queue to the SM 340. Again, the geometric primitives included in the result queue were those primitives associated with nodes (i.e., bounding volumes) that intersected the ray and, therefore, are the results associated with a particular tree traversal operation intersecting the ray with the BVH. Once the traversal stack data structure in local storage 504 has been updated and the one or more traversal units 530 have indicated to the stack management unit 540 that the tree traversal of the block of the tree data structure is complete, the stack management unit 540 may indicate to the scheduler 510 that the tree traversal operation for the particular ray data structure is ready to be re-launched if the traversal stack data structure is not empty.

The preceding description of the TTU 500, in accordance with one embodiment, utilizes an optimized block-based tree traversal algorithm that is discussed in more detail below. It will be appreciated that the architecture of the TTU 500 may be optimized for different types of tree traversal algorithms, and that the architecture of the TTU 500 may be changed for different algorithms utilized for different types of hardware architectures. The block-based tree traversal algorithm is just one method for optimizing tree traversal operations on high-latency memory architecture systems such as the PPU 200. In one embodiment, the various units of the TTU 500 (e.g., the setup unit 520, the traversal units 530, etc.) may be implemented as fixed function logic, configured to implement the functionality of each of the units described above. In another embodiment, one or more of the units of the TTU 500 may be programmable logic devices that are configured to execute instructions transmitted to the TTU 500 by the SM 340 or read from the memory 204. The units may execute the instructions to implement the functionality of each of the units described above in a programmable manner. For example, the traversal units 530 may be programmable devices configured to execute a program stored in the memory 204 to process one or more nodes of the tree data structure.

Figure 6A:
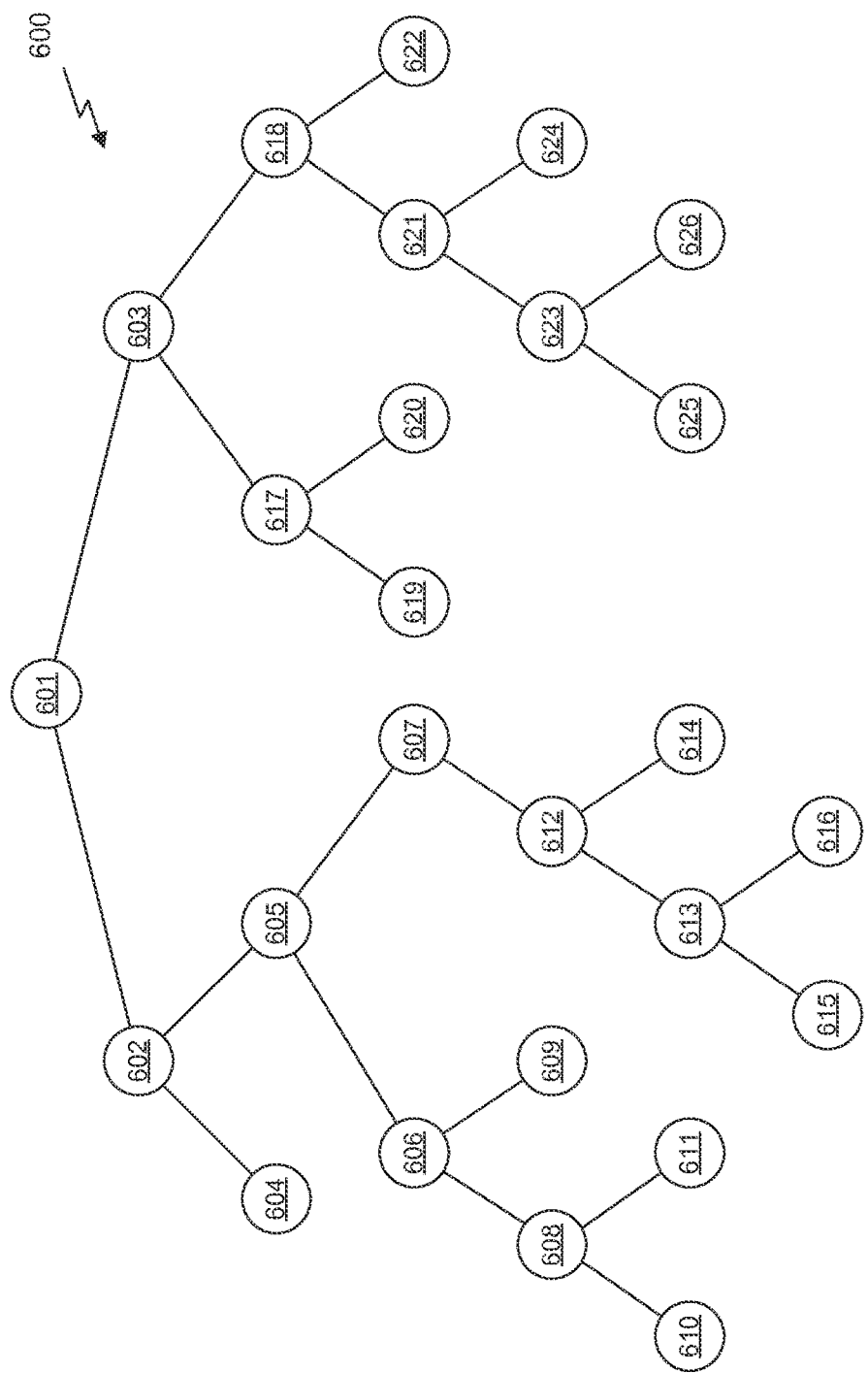
FIGS. 6A & 6B illustrate a typical tree data structure that represents a bounding volume hierarchy (BVH) associated with a 3D model, in accordance with the prior art.
Figure 6B:
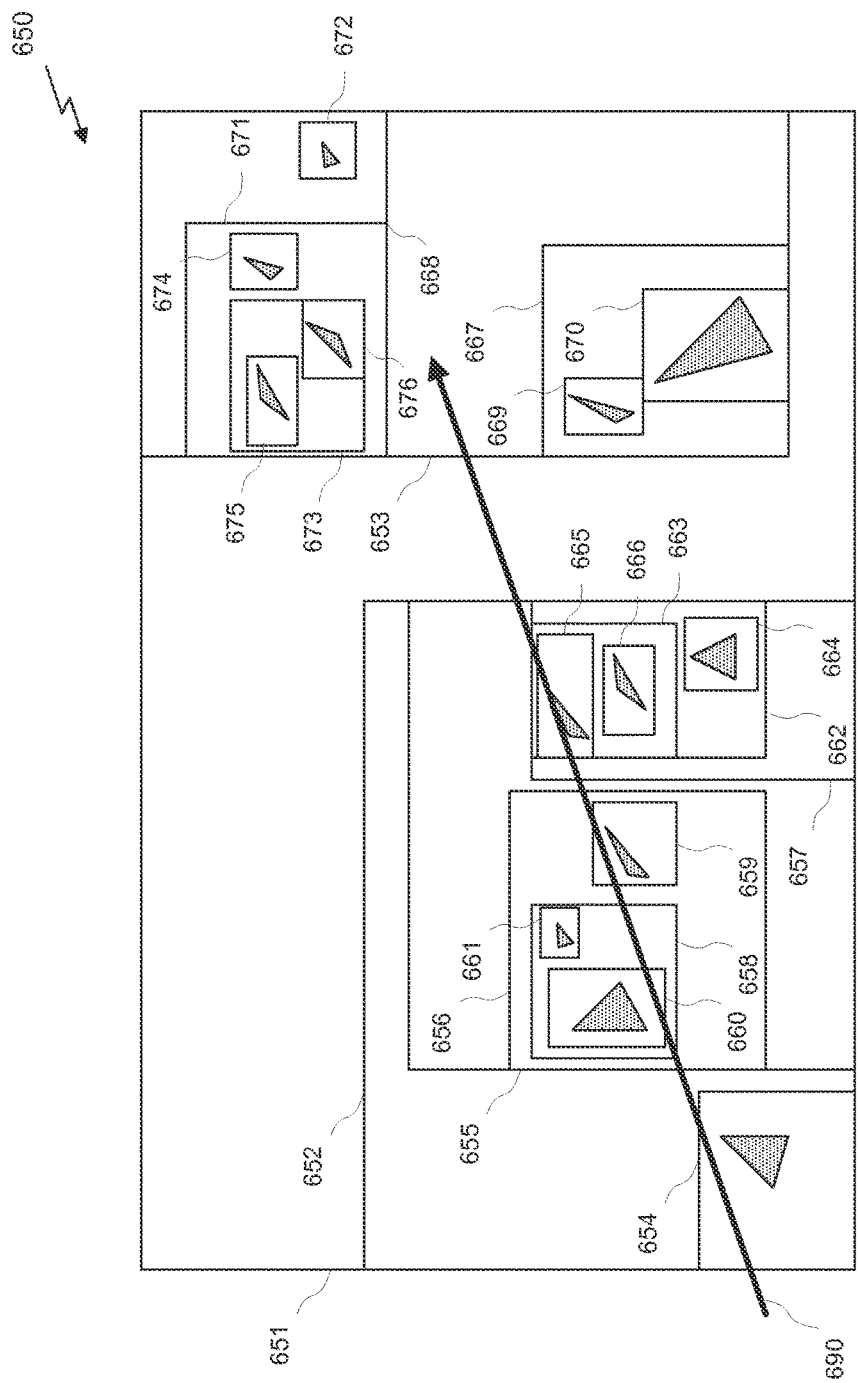

FIGS. 6A & 6B illustrate a typical tree data structure 600 that represents a bounding volume hierarchy (BVH) 650 associated with a 3D model, in accordance with the prior art. The tree data structure 600 includes a plurality of nodes, and each node has zero or more child nodes. The tree data structure 600 includes a root node 601 that indicates the start of the tree data structure 600. All other nodes in the tree data structure 600 descend from the root node 601. Nodes having zero child nodes may be referred to as leaf nodes. Leaf nodes may include an element or a pointer to an element stored in the tree data structure 600. Leaf nodes may be associated with a bounding volume that encloses one or more elements of the 3D model. For example, the elements may include geometric primitives of the 3D model. The tree data structure 600 includes leaf nodes 604, 609, 610, 611, 614, 615, 616, 619, 620, 622, 624, 625, and 626. Nodes that include one or more child nodes may be referred to as internal nodes. Internal nodes may be associated with a bounding volume that encloses the elements of the 3D model associated with the descendent leaf nodes of the internal node. The tree data structure 600 includes internal nodes 601, 602, 603, 605, 606, 607, 608, 612, 613, 617, 618, 621, and 623.

As shown in FIG. 6A, the tree data structure 600 is a binary tree data structure. In one embodiment, the binary tree data structure represents a BVH 650 associated with a 3D scene or 3D model that includes a number of geometric primitives, as shown in FIG. 6B. It will be appreciated that the tree data structure 600 is shown for illustration only and is quite small when compared to tree data structures generated from typical 3D models in, for example, computer graphics. Such tree data structures may contain thousands or millions of nodes.

As shown in FIG. 6B, a 3D model comprising a number of geometric primitives (i.e., the shaded triangles) may be associated with a BVH 650. In other words, each geometric primitive may be associated with a bounding volume that fully encloses the geometric primitive and then multiple geometric primitives in close proximity may be bounded by a higher-level bounding volume. The hierarchy is established through multiple levels of larger and larger bounding volumes until a single bounding volume encloses all of the lower-level bounding volumes. The single bounding volume may be associated with the root node 601 in the tree data structure 600.

It will be appreciated that the illustration of the BVH 650 is shown in two dimensions, rather than three dimensions, and that the bounding volumes are illustrated as bounding rectangles. However, the abstract concepts illustrated herein for a two-dimensional system may be applied equally as well to higher-dimensional system (e.g., a three-dimensional system, etc.) using, for example, axis-aligned bounding boxes (AABB). In addition, the bounding volumes are not limited to AABBs. In other embodiments, bounding volumes may be spheroid, cylindrical, or any other closed geometric surface.

As shown in FIG. 6B, the BVH 650 includes bounding boxes 651, 652, 653, 655, 656, 657, 658, 662, 663, 667, 668, 671, and 673, which correspond to nodes 601, 602, 603, 605, 606, 607, 608, 612, 613, 617, 618, 621, and 623 of the tree data structure 600, respectively. These bounding boxes contain one or more additional lower-level bounding boxes. Similarly, the BVH 650 includes bounding boxes 654, 659, 660, 661, 664, 665, 666, 669, 670, 672, 674, 675, and 676, which correspond to nodes 604, 609, 610, 611, 614, 615, 616, 619, 620, 622, 624, 625, and 626 of the tree data structure 600, respectively. These bounding boxes contain one or more geometric primitives and, therefore, are represented in the tree data structure 600 by the leaf nodes.

FIG. 6B also shows a ray 690 that is associated with a tree traversal operation. Ray-tracing techniques, for example, involve the operation of intersecting a plurality of rays with the geometric primitives of a model. One method of performing the ray-tracing operations is to generate a tree data structure that represents the model. Then, for each ray generated by the algorithm, the ray is tested against the tree data structure to determine which geometric primitives are intersected by the ray. The tree data structure significantly decreases the time required to determine which geometric primitives are intersected by the ray by discarding large groups of geometric primitives when a bounding volume that contains a subset of the geometric primitives is not intersected by the ray.

Tree Traversal Operation

Tree data structures may be traversed according to various algorithms. One algorithm may perform a tree traversal operation according to a depth-first traversal method. Another algorithm may perform a tree traversal operation according to a breadth-first traversal method. As each node in the tree data structure is traversed, one or more child nodes of the node may be tested for intersection with a query data structure, such as a ray. Each of the intersected child nodes may need to be traversed with respect to additional paths in the tree data structure that descend from those child nodes.

There are many techniques for managing the tree traversal operation. One technique is to use a stack data structure to temporarily store any nodes of the tree data structure encountered during the traversal that represent alternate paths to take while traversing the tree. When a particular node is processed by the traversal algorithm, each of the child nodes of the node are tested for intersection with the query data structure. Then, each of the intersected child nodes (i.e., those child nodes that intersect the query data structure) are added to the stack data structure. Then, as long as the stack data structure includes at least one element, the top element of the stack data structure is popped from the stack data structure and the process of testing the child nodes of the popped node for intersection with the query data structure is repeated. However, tree data structures can be very large and, therefore, the size of the stack data structure can grow very large. Since a different stack data structure is maintained for each of the tree traversal operations being processed simultaneously on a processor, the amount of required memory can sometimes overrun the available physical memory of a system or, at the very least, reduce the efficiency of the application by limiting the number of tree traversal operations that may be processed in parallel.

An alternative technique for performing a tree traversal operation uses a stack-less algorithm. In one stack-less traversal algorithm, additional state may be stored in each node, such as a pointer to a parent node for that node. The tree traversal operation is performed on the tree until either a leaf node is encountered or the result of the intersection test for a node indicates that the query data structure does not intersect the node. Then, the traversal backtracks up the tree by following the pointers to the parent nodes until another child node is encountered that needs to be processed. For example, with a binary tree data structure, a depth-first traversal operation may always follow an intersected left-child of a node while traversing down the branches of the tree before following an intersected right-child of the node. During back-tracking, each parent node is inspected until an intersected right-child of a node is discovered and the traversal operation may be continued for the intersected right-child node and any children of the intersected right-child node. In another example, the ordering for following a particular path may be dynamic based on the characteristics of the child nodes, such as by calculating a distance from a query data structure to a bounding volume for each of the child nodes. However, the particular ordering of traversal must remain consistent within each node during a particular tree traversal operation and, therefore, the backtracking operation may track, by tracking which child node was previously visited, whether any remaining child nodes of the node may still need to be processed. For example, by tracking which child node was previously visited, the operation may determine which child nodes are associated with distances that are less than the distance associated with the previously visited child node and select a new path based on those distances.

Other stack-less algorithms may also be implemented, such as by maintaining a data structure that stores the current path of the tree data structure that has been traversed. Once a given path has reached either a leaf node or an internal node that does not intersect the query data structure, then the traversal may be restarted from the root node up until a point where a right-child path may not have been taken, and the alternate path may then be traversed.

Yet another technique for performing a tree traversal operation is to use a short stack technique. The short stack technique is similar to the traversal using a full stack data structure, except that the size of the stack data structure is limited. For example, a stack data structure may be limited to 4 entries, 8 entries, 16 entries, 32 entries, 64 entries, or another numbers of entries based on the hardware architecture. The tree traversal operation is performed similar to the full stack data structure algorithm described above except that once the short stack data structure becomes full, the elements at the bottom of the short stack data structure may drop out of the short stack data structure so that new elements may be added to the top of the short stack data structure while not causing a stack overflow. However, unlike the full stack data structure algorithm, when the short stack data structure is empty, the tree traversal operation may not be complete because one or more nodes that represent paths that still need to be traversed may have been dropped from the bottom of the short stack data structure. Thus, additional state may be required to know where to restart the traversal operation once the short stack data structure is empty. For example, a bit string may be stored to indicate the path of the tree that has already been traversed.

All of these techniques have their advantages and disadvantages in a given application executed within particular hardware architectures. For example, the full stack data structure algorithm may be more efficient than the stack-less algorithm or the short stack data structure algorithm, but could be limited by available memory. Trying to maintain the full stack data structure in external memory rather than local memory associated with a GPU may make the full stack data structure algorithm much less efficient. Similarly, the additional state needed to be maintained for the stack-less algorithm or the short stack data structure algorithm, may require additional memory that makes these algorithms harder to implement. Thus, there is a need to improve these conventional algorithms.

Figure 7A:
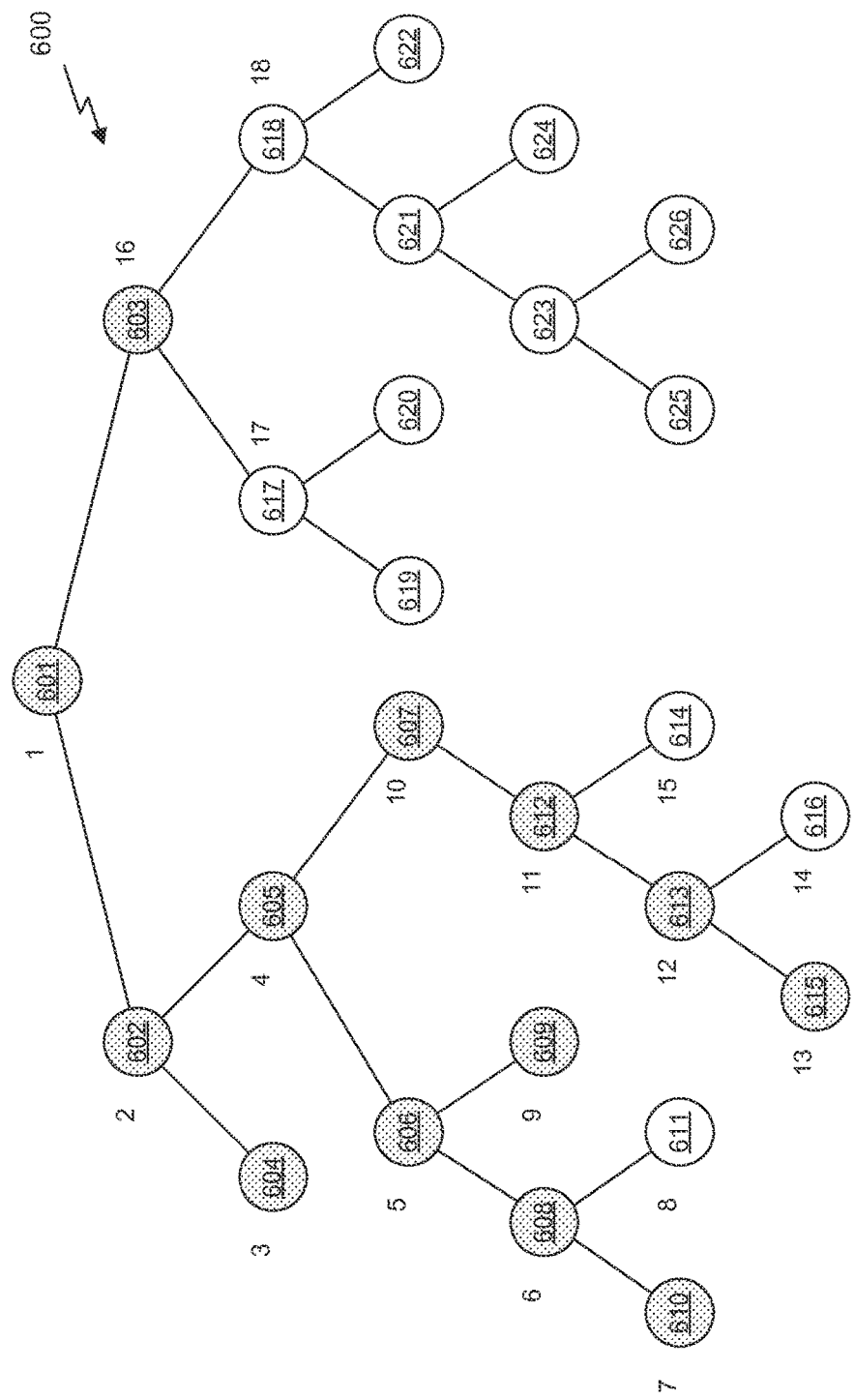
FIG. 7A illustrates a tree traversal operation associated with the tree data structure 600 of FIG. 6A, in accordance with one embodiment.

FIG. 7A illustrates a tree traversal operation associated with the tree data structure 600 of FIG. 6A, in accordance with one embodiment. The tree traversal operation may combine certain aspects of the short stack data structure algorithm described above with a back-tracking technique such as the technique utilized in the stack-less algorithm described above.

Again the tree data structure 600 represents the BVH 650 of FIG. 6B. As shown in FIG. 7A, the tree traversal operation comprises a depth-first traversal of the tree data structure 600 to test for intersection with the ray 690. Each of the nodes that have a bounding volume that intersects the ray 690 is represented as a shaded node. An intersection test performed for a given node determines whether the ray 690 intersects the bounding volume associated with that node. In the case of a 2D bounding rectangle, the ray 690 intersects the bounding rectangle if the ray 690 crosses any of the four edges of, or is enclosed within, the bounding rectangle. In the case of a 3D bounding volume, the ray 690 intersects the bounding volume if the ray 690 passes into or through the closed surface of, or is enclosed within, the bounding volume. For example, with an AABB, the ray 690 intersects the AABB if any point on the ray 690 lies inside the volume defined by the six planes that comprise the AABB.

A tree traversal operation utilizing a short stack data structure may be implemented using an algorithm that includes a processing loop for testing a particular node or nodes in the tree data structure 600 for intersection with the ray 690 during each iteration of the loop. In one embodiment, during each iteration of the loop, a node is popped from the short stack data structure and tested for intersection with the ray 690. If the node intersects the ray 690, then any child nodes of the node are added to the short stack data structure and execution of the loop is repeated if the short stack data structure is not empty. In another embodiment, during each iteration of the loop, a node is popped from the short stack data structure and each of the child nodes associated with the node are tested for intersection with the ray 690. Zero or more intersected child nodes are then added to the short stack data structure and execution of the loop is repeated if the short stack data structure is not empty. The order of nodes tested during a depth-first traversal of the tree data structure 600 is shown next to each node.

Figure 7B:
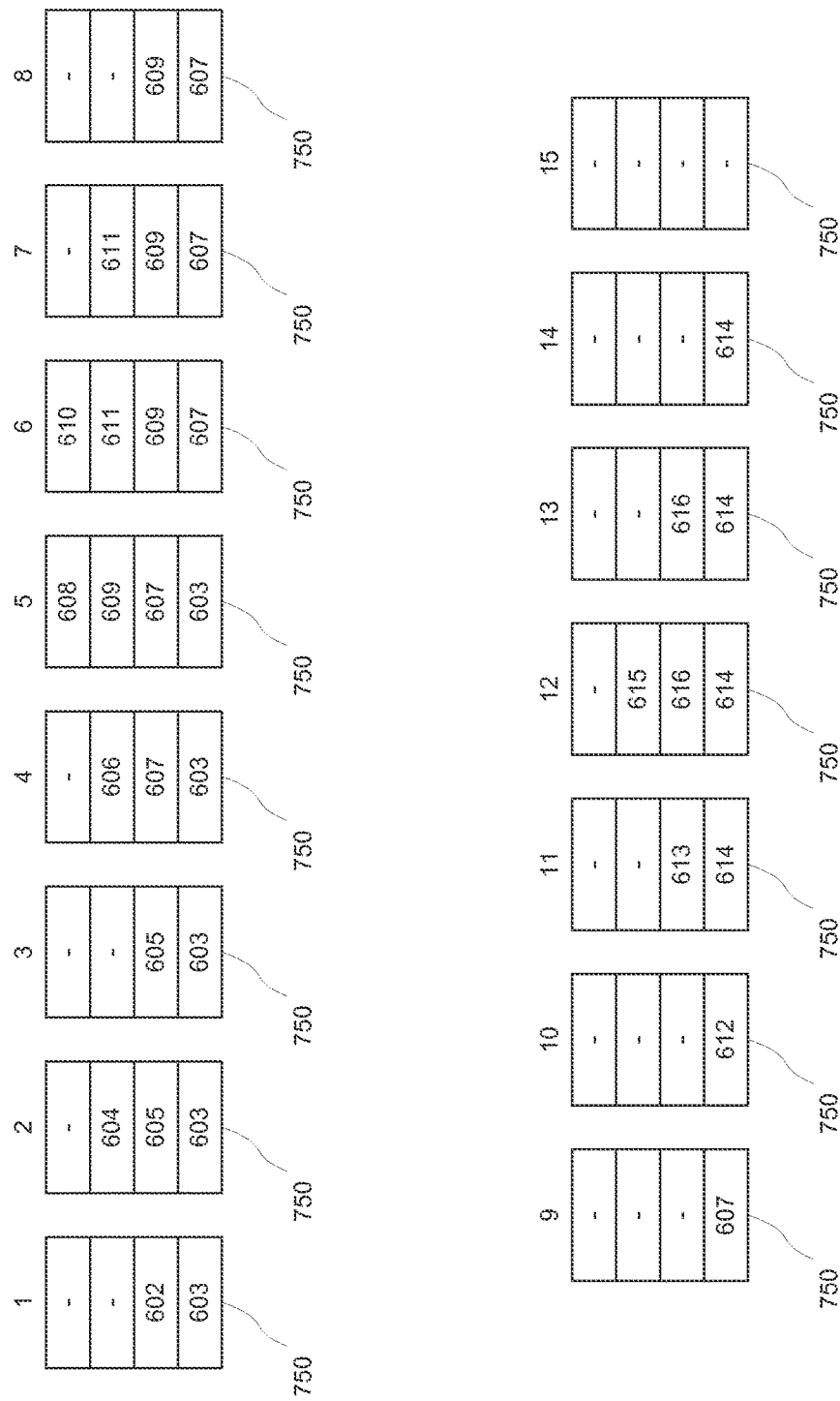
FIGS. 7B & 7C illustrate the state of a short stack data structure after each iteration of a loop in a tree traversal operation, in accordance with one embodiment.
Figure 7C:
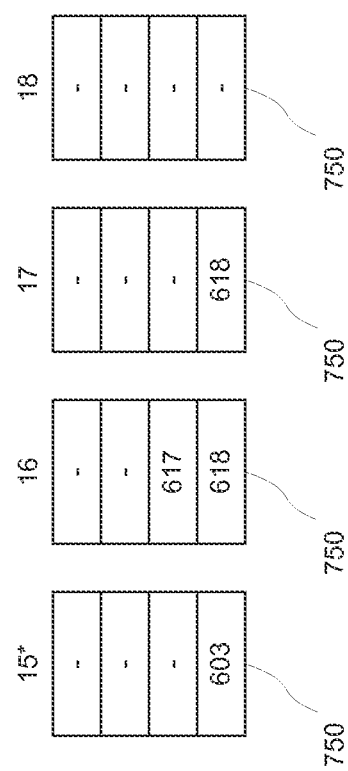

FIGS. 7B & 7C illustrate the state of a short stack data structure 750 after each iteration of a loop in a tree traversal operation, in accordance with one embodiment. As illustrated in FIG. 7B, the short stack data structure 750 may include four slots. It will be appreciated that the exact number of slots included in the short stack data structure 750 shown in FIG. 7B is for illustration purposes and that more slots may be included in the short stack data structure 750. Again, the tree traversal operation is a depth-first traversal of the tree data structure 600. The tree traversal operation may be performed by a processor, such as PPU 200. In one embodiment, the tree traversal operation is executed by the TTU 500 of PPU 200. In order to start the tree traversal operation, the root node 601 of the tree data structure 600 is pushed onto a short stack data structure 750 and a processing loop is executed a number of times.

As shown in FIG. 7B, during the first iteration of the loop, the top element is popped from the short stack data structure 750, which corresponds to node 601. A processor may fetch the data associated with the bounding volume associated with the root node 601 and test that bounding volume for intersection with the ray 690. For node 601, the intersection test returns true and the child nodes of node 601 are added to the short stack data structure 750. In this case, child nodes are tested left to right, so child nodes are added to the short stack data structure 750 from right to left.

During a second iteration of the loop, the top element is popped from the short stack data structure 750, which corresponds to node 602. The data associated with the bounding volume for node 602 is fetched and tested for intersection with the ray 690. For node 602, the intersection test returns true and the child nodes of node 602 (e.g., nodes 604 and 605) are added to the short stack data structure 750. During a third iteration of the loop, the top element is popped from the short stack data structure 750, which corresponds to node 604, which is a leaf node and doesn't have any child nodes. The data associated with the bounding volume for node 604 is fetched and tested for intersection with the ray 690. For node 604, the intersection test returns true, but since node 604 is a leaf node, the geometric primitive(s) associated with node 604 is added to a results queue. It will be appreciated that even though the bounding volume associated with node 604 was intersected by the ray 690, the geometric primitive(s) enclosed by that bounding volume may not be intersected by the ray 690. Thus, the geometric primitive(s) should be separately tested for intersection with the ray 690. Intersection of the geometric primitive(s) with the ray 690 may be performed outside the loop for all geometric primitives selected during the tree traversal operation and added to the results queue.

During the fourth iteration of the loop, the top element is popped from the short stack data structure 750, which corresponds to node 605. The data associated with the bounding volume for node 605 is fetched and tested for intersection with the ray 690. For node 605, the intersection test returns true and the child nodes of node 605 (e.g., nodes 606 and 607) are added to the short stack data structure 750. During the fifth iteration of the loop, the top element is popped from the short stack data structure 750, which corresponds to node 606. The data associated with the bounding volume for node 606 is fetched and tested for intersection with the ray 690. For node 606, the intersection test returns true and the child nodes of node 606 (e.g., nodes 608 and 609) are added to the short stack data structure 750. After the fifth iteration of the loop, the short stack data structure 750 is full.

During the sixth iteration of the loop, the top element is popped from the short stack data structure 750, which corresponds to node 608. The data associated with the bounding volume for node 608 is fetched and tested for intersection with the ray 690. For node 608, the intersection test returns true and the child nodes of node 608 (e.g., nodes 610 and 611) are added to the short stack data structure 750. However, because there are two nodes to add to the short stack data structure 750 and there is only one empty slot in the short stack data structure 750, one element must be removed from the bottom of the short stack data structure 750. As shown, node 603 is dropped from the short stack data structure 750 and nodes 610 and 611 are pushed onto the top of the short stack data structure 750.

The tree traversal continues in this fashion until the fifteenth iteration of the loop, where the top element is popped from the short stack data structure 750, which corresponds to node 614. The data associated with the bounding volume for node 614 is fetched and tested for intersection with the ray 690. For node 614, the intersection test returns false and all descendants of node 602 have now been tested and the short stack data structure 750 is empty. However, because one or more nodes may have been dropped from the bottom of the short stack data structure 750, the tree traversal operation may not be complete.

In one embodiment, the processing loop may include instructions at the end of the loop that, when executed by the processor, determine whether the short stack data structure 750 is empty. If the short stack data structure 750 is empty, then a back-tracking operation may be performed. In one embodiment, the back-tracking operation may be implemented by an inner loop that traverses up the tree data structure 600 until a parent node is reached that includes a child node that still needs to be processed. In the case of node 614, the back-tracking operation would inspect node 612 as the parent node of node 614. Because node 614 is the right-child node of node 612, no further child nodes of node 612 need to be processed. The back-tracking operation continues by checking the parent node of node 612, which is node 607. Node 612 is the left-child node of node 607 and node 607 does not have any right-child node. Thus, the back-tracking operation continues by checking the parent node of node 607, which is node 605. Again, because node 607 is the right-child node of node 605, no further child nodes of node 605 need to be processed. The back-tracking operation continues by checking the parent node of node 605, which is node 602. Again, because node 605 is the right-child node of node 602, no further child nodes of node 602 need to be processed. The back-tracking operation continues by checking the parent node of node 602, which is node 601, the root node of the tree data structure 600. Node 601 has a right-child node 603 that still needs to be processed. Consequently, the back-tracking operation pushes node 603 onto the short stack data structure 750 and iteration of the loop is resumed.

As shown in FIG. 7C, after the fifteenth iteration of the loop and after the back-tracking operation has been performed, then the short stack data structure 750 includes node 603. During a sixteenth iteration of the loop, the top element is popped from the short stack data structure 750, which corresponds to node 603. The data associated with the bounding volume for node 603 is fetched and tested for intersection with the ray 690. For node 603, the intersection test returns true and the child nodes of node 603 (e.g., nodes 617 and 618) are added to the short stack data structure 750. During the seventeenth iteration of the loop, the top element is popped from the short stack data structure 750, which corresponds to node 617. The data associated with the bounding volume for node 617 is fetched and tested for intersection with the ray 690. For node 617, the intersection test returns false and no nodes are added to the short stack data structure 750. During the eighteenth iteration of the loop, the top element is popped from the short stack data structure 750, which corresponds to node 618. The data associated with the bounding volume for node 618 is fetched and tested for intersection with the ray 690. For node 618, the intersection test returns false and no nodes are added to the short stack data structure 750. At this point, the short stack data structure 750 is empty.

Once again, the back-tracking operation may be performed. The last node to be tested was node 618. In the case of node 618, the back-tracking operation would inspect node 603 as the parent node of node 618. Because node 618 is the right-child node of node 603, no further child nodes of node 603 need to be processed. The back-tracking operation continues by checking the parent node of node 603, which is root node 601. Because node 603 is the right-child node of node 601, no further child nodes of node 601 need to be processed. Because node 601 is the root node of the tree data structure 600, the tree traversal operation is complete. The result of the tree traversal operation has determined that the geometric primitives associated with nodes 604, 609, 610, and 615 are potentially intersected by the ray 690. These four geometric primitives may then be tested for intersection with the ray 690.

Table 1 shows pseudo-code for a tree traversal operation utilizing a short stack data structure and a back-tracking operation, as shown in FIGS. 7A-7C. In the pseudo-code, the main for statement comprises the main loop of the tree traversal operation, where, during each iteration of the loop, a particular node of the tree data structure 600 is tested for intersection with a query data structure (e.g., the ray 690, etc.), thereby traversing the tree data structure 600. Before the main for loop is executed, the root node of the tree data structure 600 is pushed onto the short stack data structure 750.

TABLE 1

```
Tree tree;
Ray ray;
Stack shortStack = new Stack( );
shortStack.push(tree.root( ));
for (;;) {
```

TABLE 1-continued

```
Node node = shortStack.pop( );
if (node.intersects(ray)) {
    if (node.isLeaf( )) {
        addToResultQueue(ray, node.element);
    } else {
        for (int i = node.numChildren−1; i >= 0; i−−) {
            shortStack.push(node.child[i]);
        }
    }
}
// perform back-tracking operation is short stack is empty
while (shortStack.isEmpty( )) {
    if (node == tree.root)
        return;    // end tree traversal operation
    int enter = node.childIdxInParent;
    node = node.parent;
    for (int i = node.numChildren−1; i > enter; i−−) {
        shortStack.push(node.child[i]);
    }
}
}
```

Within the main for loop, the top element is popped from the short stack data structure 750 and assigned to the node variable. If the node intersects the ray 690 and the node is a leaf node, then the elements stored in the leaf node are added to a result queue. However, if the node intersects the ray 690 and the node is not a leaf node, then each of the child nodes of the node are pushed onto the short stack data structure 750. It will be appreciated that each of the child nodes of the node are pushed onto the short stack data structure 750 in a reverse order. If the short stack data structure 750 is not empty, then the main for loop is repeated for the top element in the short stack data structure 750 during the next iteration of the main for loop. However, if the short stack data structure 750 is empty, then a back-tracking operation may be performed.

In one embodiment, the back-tracking operation is implemented using a nested loop structure. As shown, a while loop may be executed during each iteration of the main for loop. The first step in the while loop is determining whether the current node is the root node of the tree data structure 600. If the current node is the root node of the tree data structure 600, then there are no more nodes to process and the tree traversal operation is complete. However, if the current node is not the root node of the tree data structure 600, then a state variable (i.e., the enter variable) is set equal to a value of a child index of the current node. The child index may represent an order of traversal of the current node relative to the other child nodes of a parent node of the current node. In other words, a first node associated with a larger child index than a second node is later in the traversal order than the second node, when both the first node and second node are child nodes of a parent node. In a binary tree, the child index for a node may be, e.g., 0 or 1 and may indicate whether the current node is a left-child or a right-child of a corresponding parent node. Once the child index of the node has been stored in the enter variable, the node variable may be set to the parent node of the current node. Any child nodes of the parent node having a child index greater than the value of the enter variable are pushed onto the short stack data structure 750. If no additional child nodes are pushed onto the short stack data structure 750, then the while loop may be repeated to continue traversing up the tree data structure 600 until a new node that needs to be processed is identified or the root node of the tree data structure 600 is reached without identifying any new nodes that need to be processed.

Again, the back-tracking operation may need to be performed because the limited size of the short stack data structure 750 means that some elements may have been dropped from the bottom of the short stack data structure 750 when other elements were pushed onto the top of the short stack data structure 750 during the traversal. Once the back-tracking operation is complete, and the short stack data structure 750 includes at least one element, the tree traversal operation may be resumed by executing another iteration of the main for loop.

It will be appreciated that the pseudo-code shown in Table 1 may be modified for various implementations within the scope of the present disclosure. In one embodiment, the back-tracking operation may be conditionally executed only if a flag is set during one of the iterations of the main for loop. For example, a flag variable may be cleared prior to executing the main for loop. Each time that nodes are pushed onto the top of the short stack data structure 750 in the main for loop, the flag variable may be set if one or more nodes are dropped from the bottom of the short stack data structure 750. For example, the push( ) method of a short stack object may be configured to return a boolean value for the flag variable each time an element is pushed onto the top of the short stack data structure 750. If no elements are dropped from the bottom of the short stack data structure 750, then the return value may be set to FALSE. Alternately, if an element is dropped from the bottom of the short stack data structure 750, then the return value may be set to TRUE. The value of the flag variable may be set by performing a logical OR operation with the current value of the flag variable and the boolean return value of the push( ) method. In other words, if any push operation results in a TRUE return value, then the flag variable will be set to TRUE and will remain TRUE for the remainder of the tree traversal operation.

In another embodiment, the push( ) method may return an integer value that indicates a number of elements that were dropped from the bottom of the short stack data structure 750. If no elements are dropped from the bottom of the short stack data structure 750, then the push( ) method returns a value of 0, if one element is dropped from the bottom of the short stack data structure 750, then the push( ) method returns a value of 1, and so forth. The value returned by the push( ) method may be used to increment a value of the flag variable, which stores a counter that represents the total number of elements that have been dropped from the bottom of the short stack data structure 750. In the embodiment illustrated by the pseudo-code of Table 1, the push( ) method is designed to accept a single parameter, which represents a single node. In this case, the push( ) method is configured to return a value of either 0 or 1 to indicate whether zero or one elements have been dropped from the bottom of the short stack data structure 750, respectively. However, in other embodiments, the push( ) method may be designed to accept a different type of parameter, which represents multiple nodes. For example, the push( ) method may accept as a parameter a list of nodes or some other type of data structure that represents a set of one or more nodes. In those embodiments, a variable number of elements may be pushed onto the short stack data structure 750 when the push( ) method is called, and the value returned by the push( )(method may reflect a total number of elements dropped from the bottom of the short stack data structure 750 (e.g., 0, 1, 2, 3, etc.).

Figure 7D:
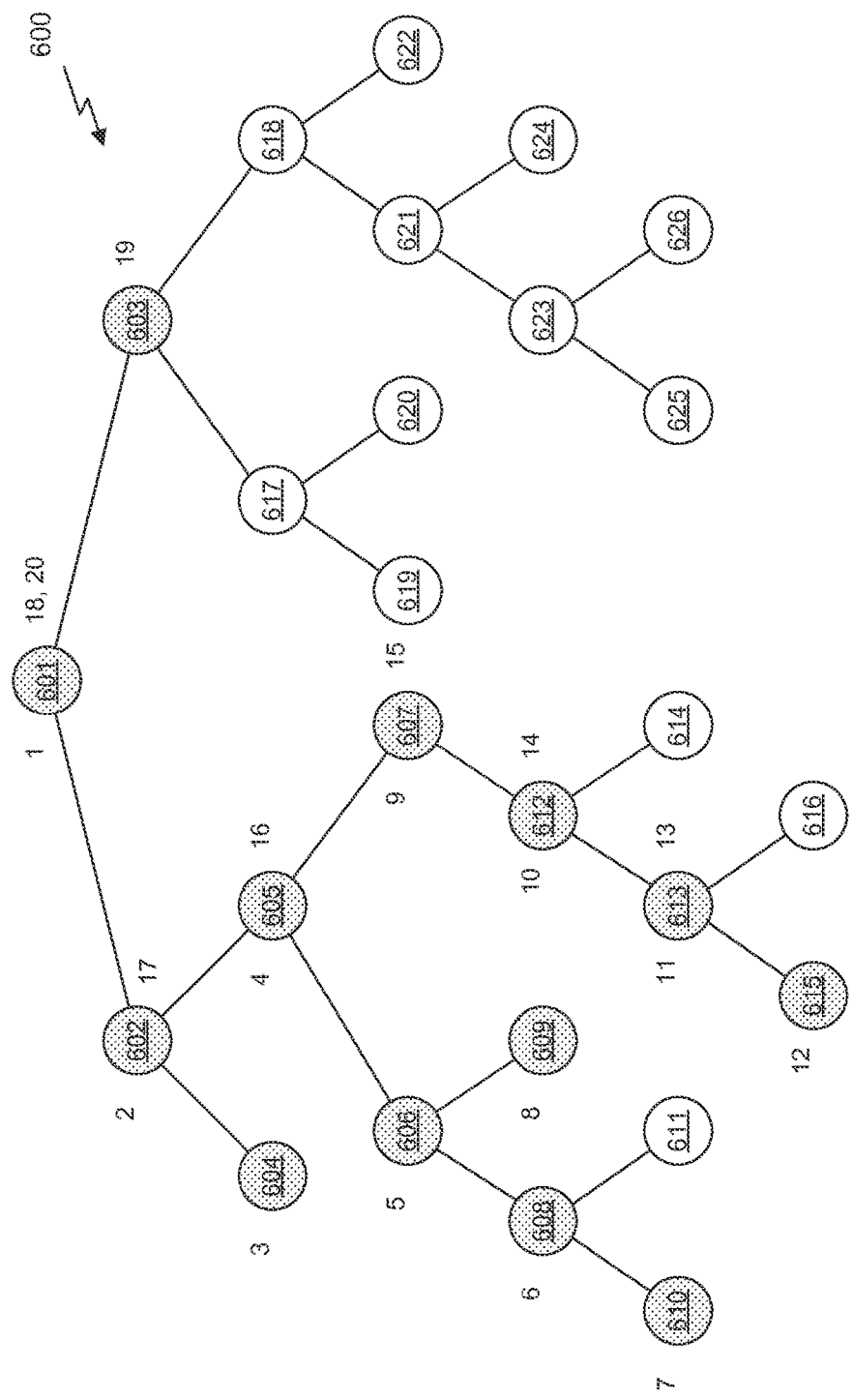
FIG. 7D illustrates a tree traversal operation associated with the tree data structure 600 of FIG. 6A, in accordance with another embodiment.

FIG. 7D illustrates a tree traversal operation associated with the tree data structure 600 of FIG. 6A, in accordance with another embodiment. The tree traversal operation may be similar to the operation described above in reference to FIGS. 7A-7C, except that, during each iteration of the loop, the child nodes of the current node are tested for intersection with a query data structure and zero or more intersected child nodes are added to the short stack data structure 750.

As shown in FIG. 7D, the tree traversal operation comprises a depth-first traversal of the tree data structure 600 to test for intersection with the ray 690. Each of the nodes that have a bounding volume that intersects the ray 690 is represented as a shaded node. While processing each node, all of the child nodes of the node may be tested for intersection with the ray 690. Once a given path has been followed to the end of the path (i.e., where no child nodes are intersected by the ray 690 and the short stack data structure 750 is empty), then a back-tracking operation may be performed. The back-tracking operation may include pushing a node onto the short stack data structure 750 based on the previous node that was processed.

Figure 7E:
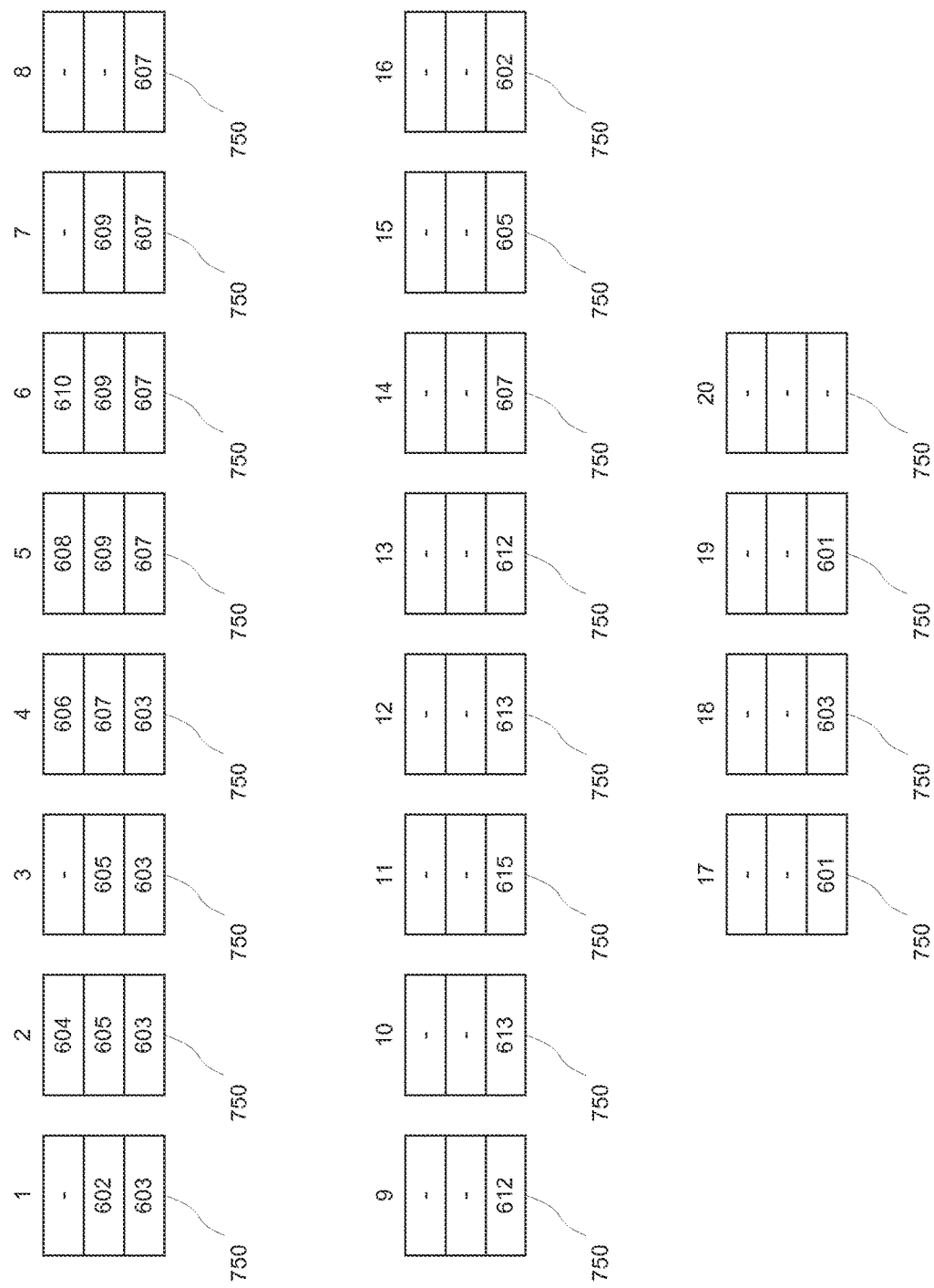
FIG. 7E illustrates the state of a short stack data structure 750 after each iteration of a loop in a tree traversal operation, in accordance with another embodiment.

FIG. 7E illustrates the state of a short stack data structure 750 after each iteration of a loop in a tree traversal operation, in accordance with another embodiment. Again, while processing each node, all of the child nodes of the node may be tested for intersection with the ray 690. As illustrated in FIG. 7E, the short stack data structure 750 may include three slots. It will be appreciated that three slots have been chosen instead of four slots (as shown in FIGS. 7B & 7C) for illustration purposes in order to illustrate a tree traversal operation that requires the back-tracking operation to be performed.

Similar to the tree traversal operation set forth above, the tree traversal operation illustrated by FIGS. 7D & 7E is a depth-first traversal of the tree data structure 600. The tree traversal operation may be performed by a processor, such as PPU 200. In one embodiment, the tree traversal operation is executed by the TTU 500 of PPU 200. In order to start the tree traversal operation, the root node 601 of the tree data structure 600 is pushed onto a short stack data structure 750 and a processing loop is executed a number of times.

As shown in FIG. 7E, during the first iteration of the loop, the top element is popped from the short stack data structure 750, which corresponds to node 601. A processor may fetch the data associated with the bounding volume(s) associated with each of the child nodes of the root node 601 (e.g., bounding volumes for nodes 602 and 603) and test each of the bounding volumes for intersection with the ray 690. For nodes 602 and 603, the intersection test returns true and nodes 602 and 603 are added to the short stack data structure 750, in reverse order.

During a second iteration of the loop, the top element is popped from the short stack data structure 750, which corresponds to node 602. A processor may fetch the data associated with the bounding volume(s) associated with each of the child nodes of node 602 (e.g., bounding volumes for nodes 604 and 605) and test each of the bounding volumes for intersection with the ray 690. For nodes 604 and 605, the intersection test returns true and nodes 604 and 605 are added to the short stack data structure 750. During a third iteration of the loop, the top element is popped from the short stack data structure 750, which corresponds to node 604. Node 604 is a leaf node. Thus, any elements included in node 604 may be added to a result queue. Because the short stack data structure 750 is not empty at this time, the tree traversal operation continues at the next iteration.

During a fourth iteration of the loop, the top element is popped from the short stack data structure 750, which corresponds to node 605. A processor may fetch the data associated with the bounding volume(s) associated with each of the child nodes of node 605 (e.g., bounding volumes for nodes 606 and 607) and test each of the bounding volumes for intersection with the ray 690. For nodes 606 and 607, the intersection test returns true and nodes 606 and 607 are added to the short stack data structure 750. During a fifth iteration of the loop, the top element is popped from the short stack data structure 750, which corresponds to node 606. A processor may fetch the data associated with the bounding volume(s) associated with each of the child nodes of node 606 (e.g., bounding volumes for nodes 608 and 609) and test each of the bounding volumes for intersection with the ray 690. For nodes 608 and 609, the intersection test returns true and nodes 608 and 609 are added to the short stack data structure 750. However, there is only one available slot in the short stack data structure 750. To make room for both nodes 608 and 609 in the short stack data structure 750, at least one element (e.g., node 603) may be dropped from the bottom of the short stack data structure 750.

During a sixth iteration of the loop, the top element is popped from the short stack data structure 750, which corresponds to node 608. A processor may fetch the data associated with the bounding volume(s) associated with each of the child nodes of node 608 (e.g., bounding volumes for nodes 610 and 611) and test each of the bounding volumes for intersection with the ray 690. The intersection test returns true for node 610 but false for node 611, and, therefore, node 610 is added to the short stack data structure 750, while node 611 is not. During a seventh iteration of the loop, the top element is popped from the short stack data structure 750, which corresponds to node 610. Similar to node 604, node 610 is a leaf node. Therefore, any elements included in node 610 may be added to the result queue. Because the short stack data structure 750 is not empty at this time, the tree traversal operation continues at the next iteration. During an eighth iteration of the loop, the top element is popped from the short stack data structure 750, which corresponds to node 609. Again, node 609 is a leaf node, so any elements included in node 609 may be added to the result queue. Because the short stack data structure 750 is not empty at this time, the tree traversal operation continues at the next iteration.

During a ninth iteration of the loop, the top element is popped from the short stack data structure 750, which corresponds to node 607. A processor may fetch the data associated with the bounding volume(s) associated with each of the child nodes of node 607 (e.g., a bounding volume for node 612) and test each of the bounding volumes for intersection with the ray 690. For node 612, the intersection test returns true and node 612 is added to the short stack data structure 750. During a tenth iteration of the loop, the top element is popped from the short stack data structure 750, which corresponds to node 612. A processor may fetch the data associated with the bounding volume(s) associated with each of the child nodes of node 612 (e.g., bounding volumes for nodes 613 and 614) and test each of the bounding volumes for intersection with the ray 690. The intersection test returns true for node 613 but false for node 614, and, therefore, node 613 is added to the short stack data structure 750, while node 614 is not. During an eleventh iteration of the loop, the top element is popped from the short stack data structure 750, which corresponds to node 613. A processor may fetch the data associated with the bounding volume(s) associated with each of the child nodes of node 613 (e.g., bounding volumes for nodes 615 and 616) and test each of the bounding volumes for intersection with the ray 690. The intersection test returns true for node 615 but false for node 616, and, therefore, node 615 is added to the short stack data structure 750, while node 616 is not. During a twelfth iteration of the loop, the top element is popped from the short stack data structure 750, which corresponds to node 615. Again, node 615 is a leaf node, so any elements included in node 615 may be added to the result queue. The short stack data structure 750 is currently empty, so a back-tracking operation may be performed in order to identify a new node in the tree data structure 600 that needs to be processed.

In one embodiment, a child index for the current node is stored in a state variable and a parent node of the current node is pushed onto the short stack data structure 750. A state variable may be used to indicate from which direction a particular node is being entered; i.e., the state variable indicates whether the current node was added to the short stack data structure 750 based on the processing of a parent node of the current node or the processing of a child node of the current node. In one embodiment, the state variable represents an index of the processed node. For example, the state variable may be set to −1 if the current node was added to the short stack data structure 750 while processing a parent node of the current node (i.e., during top-to-bottom traversal), and the state variable may be set to a number between 0 and n−1, representing the child nodes having an index from left to right of 0 to n−1, respectively, when the current node was added to the short stack data structure 750 while processing a corresponding child node. The state variable, it should be noted, is a variable tied to a particular tree traversal operation and, therefore, multiple state variables may be stored for multiple tree traversal operations in order to track the direction the tree is being traversed. In one embodiment, the state variable value may be pushed into the short stack data structure 750 whenever a node is pushed onto the top of the short stack data structure 750 (i.e., both the node or a pointer to the node and a value that indicates the direction of traversal may be stored in each entry of the short stack data structure 750). In such embodiments, the value of the state variable may be popped from the short stack data structure 750 along with the node so that the processor knows from what direction the current node was entered during the traversal. In another embodiment, the state variable may simply be a global variable allocated to a particular tree traversal operation and updated every time a node is pushed onto the top of the short stack data structure 750.

At the end of the twelfth iteration of the loop, the short stack data structure 750 includes node 613 and the state variable may store a value of 0, which represents a child index of a left-child node 615. During a thirteenth iteration of the loop, the top element is popped from the short stack data structure 750, which corresponds to node 613. A processor may fetch the data associated with the bounding volume(s) associated with each of the child nodes of node 613 that have a child index greater than the value in the state variable (e.g., bounding volumes for node 616, which has a child index of 1) and test each of the bounding volumes for intersection with the ray 690. In the case of node 613, only child node 616 has a child index greater than 0, but node 616 is not intersected by the ray 690, so, there are no intersected child nodes of node 613 that still need to be processed. As such, a child index for the node 613 (e.g., 0) is stored in the state variable and a parent node of node 613 (e.g., node 612) is pushed onto the short stack data structure 750. During a fourteenth iteration of the loop, the top element is popped from the short stack data structure 750, which corresponds to node 612. The processor may fetch the data associated with the bounding volume(s) associated with each of the child nodes of node 612 that have a child index greater than the value in the state variable (e.g., bounding volumes for node 614, which has a child index of 1) and test each of the bounding volumes for intersection with the ray 690. In the case of node 612, only child node 614 has a child index greater than 0, but node 614 is not intersected by the ray 690, so, there are no intersected child nodes of node 612 that still need to be processed. As such, a child index for the node 612 (e.g., 0) is stored in the state variable and a parent node of node 612 (e.g., node 607) is pushed onto the short stack data structure 750.

During a fifteenth iteration of the loop, the top element is popped from the short stack data structure 750, which corresponds to node 607. The processor may fetch the data associated with the bounding volume(s) associated with each of the child nodes of node 607 that have a child index greater than the value in the state variable, of which there are none. Thus, a child index for the node 607 (e.g., 1) is stored in the state variable and a parent node of node 607 (e.g., node 605) is pushed onto the short stack data structure 750. During a sixteenth iteration of the loop, the top element is popped from the short stack data structure 750, which corresponds to node 605. The processor may fetch the data associated with the bounding volume(s) associated with each of the child nodes of node 605 that have a child index greater than the value in the state variable, of which there are none. Thus, a child index for the node 605 (e.g., 1) is stored in the state variable and a parent node of node 605 (e.g., node 602) is pushed onto the short stack data structure 750. During a seventeenth iteration of the loop, the top element is popped from the short stack data structure 750, which corresponds to node 602. The processor may fetch the data associated with the bounding volume(s) associated with each of the child nodes of node 602 that have a child index greater than the value in the state variable, of which there are none. Thus, a child index for the node 602 (e.g., 0) is stored in the state variable and a parent node of node 602 (e.g., node 601) is pushed onto the short stack data structure 750.

During an eighteenth iteration of the loop, the top element is popped from the short stack data structure 750, which corresponds to node 601. The processor may fetch the data associated with the bounding volume(s) associated with each of the child nodes of node 601 that have a child index greater than the value in the state variable (e.g., bounding volumes for node 603, which has a child index of 1) and test each of the bounding volumes for intersection with the ray 690. In the case of node 601, the child node 603 has a child index greater than 0 and is intersected by the ray 690. In other words, the back-tracking operation has identified a new node associated with a path in the traversal that still needs to be processed, namely, all paths that descend from node 603. The state variable may be reset to, e.g., −1 to indicate that the traversal is now descending from a parent node (e.g., node 601) to a child node (e.g., node 603). Then, the node 603 is pushed onto the short stack data structure 750. During a nineteenth iteration of the loop, the top element is popped from the short stack data structure 750, which corresponds to node 603. A processor may fetch the data associated with the bounding volume(s) associated with each of the child nodes of node 603 (e.g., bounding volumes for nodes 617 and 618) and test each of the bounding volumes for intersection with the ray 690. The intersection test returns false for both node 617 and node 618, and, therefore, neither child node is added to the short stack data structure 750. Because there are no intersected child nodes and the short stack data structure 750 is empty, the back-tracking operation is performed to trace the path back up the tree data structure 600. A child index for the node 603 (e.g., 1) is stored in the state variable and a parent node of node 603 (e.g., node 601) is pushed onto the short stack data structure 750. During a twentieth iteration of the loop, the top element is popped from the short stack data structure 750, which corresponds to node 601. The processor may fetch the data associated with the bounding volume(s) associated with each of the child nodes of node 601 that have a child index greater than the value in the state variable, of which there are none. Because node 601 is the root node of the tree, the tree traversal operation is complete.

It will be appreciated that the tree data structure 600 is a binary tree data structure, but other types of data structures such as octrees, k-d trees, and the like may also be traversed using a short stack data structure 750 combined with the back-tracking operation. When a parent node includes more than two child nodes (e.g., with four-ary trees or octrees, etc.), then the back-tracking operation may be modified such that for a particular node, the back-tracking operation searches for any other child nodes of the parent node for the particular node that are arranged to the right of the particular node in the tree data structure.

In another embodiment, a flag may be utilized in order to prevent the back-tracking operation from being performed unless one or more nodes have been dropped from the bottom of the short stack data structure 750. At the beginning of a tree traversal operation for a particular query data structure, the flag may be cleared. The tree traversal operation is then performed. If a node is ever dropped from the bottom of the short stack data structure 750, such as during the sixth iteration of the loop in the tree traversal operation described above, then the flag is set. When the short stack data structure 750 is empty, the back-tracking operation is performed only when the flag is set. If the short stack data structure 750 is empty and the flag is not set, then no nodes have been dropped from the bottom of the short stack data structure 750 during the tree traversal operation and the tree traversal operation is complete.

In one embodiment, the flag is a binary flag having two values. For example, the flag may be a single bit having a value of 0 if no nodes have been dropped from the bottom of the short stack data structure 750 or a value of 1 if one or more nodes have been dropped from the bottom of the short stack data structure 750. In another embodiment, the flag may comprise a counter that tracks the number of nodes that have been dropped from the bottom of the short stack data structure 750. Each time a node is dropped from the bottom of the short stack data structure 750, the counter may be incremented by one. Each time a back-tracking operation identifies a new node to be processed, the counter may be decremented by one.

Table 2 shows pseudo-code for a tree traversal operation utilizing a short stack data structure and a back-tracking operation, as shown in FIGS. 7D-7E. In the pseudo-code shown in Table 2, the main for statement comprises the main loop of the tree traversal operation. Before the main for loop is executed, the node variable is set to the root node of the tree data structure 600 and an enter variable is set to −1 to indicate the traversal is starting moving down the tree data structure 600.

TABLE 2

```
Tree tree;
Ray ray;
Node node;
List intersectedChildren = new List( );
Stack shortStack = new Stack( );
int enter = -1;          // indicates entering from above
```

TABLE 2-continued

```
node = tree.root;        // set node to the root node
for (;;) {
    intersectedChildren.clear( );
    if(node.isLeaf( )) {
        addToResultQueue(ray, node.element);
    } else {
        intersectedChildren = node.intersectChildren(ray, enter);
    }
    enter = -1;
    if (!intersectedChildren.isEmpty( )) {
        for (int i = intersectedChildren.length( )-1; i > 0; i--) {
            shortStack.push(node.child[intersectedChildren[i]]);
        }
        node = node.child[intersectedChildren[0]];
    } else {
        if (!shortStack.isEmpty( )) {
            node = shortStack.pop( );
        } else if (node == tree.root) {
            return;      // terminate tree traversal operation
        } else {
            enter = node.childIdxInParent;
            node = node.parent;
        }
    }
}
```

It will be appreciated that the pseudo-code shown in Table 2 differs slightly with the description of the tree traversal operation illustrated in FIGS. 7D and 7E. For example, the top element of the short stack data structure 750 is not popped from the top of the short stack data structure 750 at the beginning of the main for loop. Instead, the next node is assigned to the node variable at the bottom of the main for loop. In addition, all but one intersected child nodes are pushed onto the top of the short stack data structure 750, with the remaining child node being assigned to the node variable as the next node to be processed during the tree traversal operation. In other words, rather than push all intersected child nodes onto the short stack data structure 750 at the end of one iteration of the main for loop, and then pop the top element from the short stack data structure 750 and assign the popped element to the node variable at the beginning of a subsequent iteration of the main for loop, a single intersected child node is simply assigned to the node variable and any remaining intersected child nodes are then pushed onto the short stack data structure 750. Functionally, the result of these operations is nearly identical and, therefore, such changes to the code are within the scope of the tree traversal operation algorithms, described herein.

It will also be appreciated that the structure of the pseudo-code shown in Table 2 differs from the structure of the pseudo-code shown in Table 1. For example, the pseudo-code in Table 2 does not include a nested loop for performing the back-tracking operation. Instead, during each iteration of the main for loop, the traversal either moves down the tree data structure 600 from a parent node to a child node or moves up the tree data structure from a child node to a parent node. The enter variable is set to −1 to indicate that the traversal is moving down the tree data structure 600 or set to the child index of a particular node when the traversal is moving up the tree data structure 600. The intersectChildren( ) method of the node object is then configured to return an index of any child nodes of the node that intersect the ray 690 and have an index higher than the value of the enter variable. In other words, the intersectChildren( ) method of the node object tests each of the child nodes ordered above (i.e., having a higher child index) the child index of the node that the current node was entered from for intersection with the ray 690. It will be appreciated that, in this embodiment, the current node being processed was already determined to intersect the ray during an intersection test executed within a previous iteration of the main for loop.

Furthermore, unlike the pseudo-code in Table 1, the back-tracking operation, as shown in Table 2, may be completed during one or more iterations of the main for loop. As the pseudo-code makes clear, if no intersected child nodes are discovered during the processing of a current node, the short stack data structure 750 is empty, and the current node is not the root node of the tree data structure 600, then the back-tracking operation proceeds by setting the enter variable to the child index of the current node and then setting the current node to the parent node of the current node. The main for loop is then executed again for the parent node, and the back-tracking operation may continue up the tree data structure 600 until a new node is found for processing or the root node is reached without discovering any new node that needs to be processed.

Again, in some embodiments, the back-tracking operation may be conditionally executed based on the flag variable. For example, the else if conditional statement may be modified to be: ((node==tree.root||!flag), such that the tree traversal operation is terminated if the back-tracking operation has reached the root node of the tree data structure 600 without identifying a new node that intersects the ray 690 or if the flag hasn't been set when there are no intersected child nodes of the current node and the short stack data structure 750 is empty.

The pseudo-code shown in Table 1 and Table 2 is for illustration of two possible embodiments and should not be construed as limiting. Other algorithms based on a tree traversal operation utilizing a short stack data structure 750 and implementing back-tracking operations to identify additional nodes for traversal when the short stack data structure 750 is empty are also considered within the scope of the present disclosure.

Figure 8A:
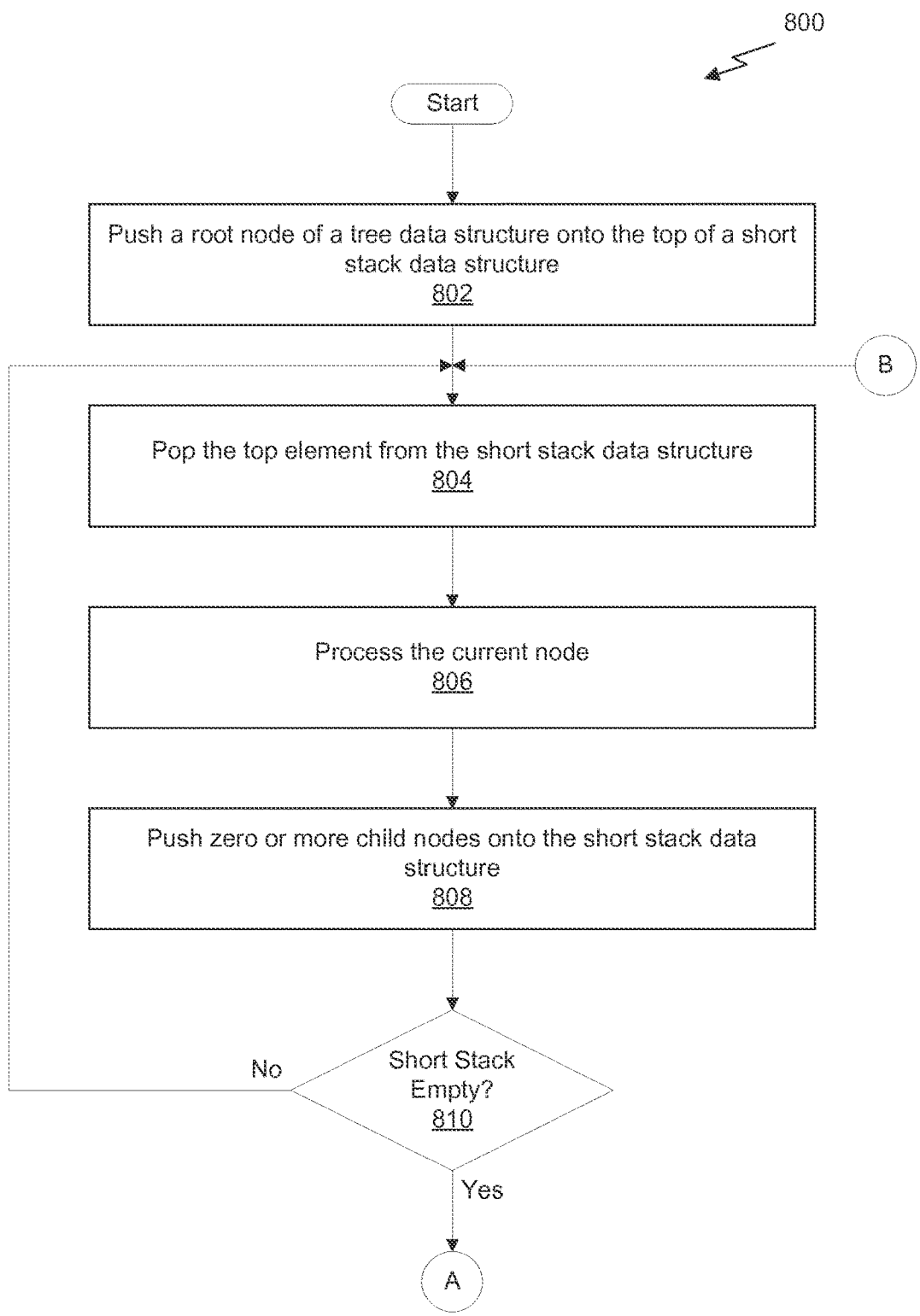
FIG. 8A illustrates a flowchart of a method for performing a tree traversal operation utilizing a short stack data structure, in accordance with one embodiment.

FIG. 8A illustrates a flowchart of a method 800 for performing a tree traversal operation utilizing a short stack data structure, in accordance with one embodiment. The method 800 may be performed by a processor such as PPU 200. At step 802, a root node of a tree data structure 600 is pushed onto the top of a short stack data structure 750. After step 802, a loop is executed, where the loop is a programming construct, implemented using such abstract programming constructs as for statements, do statements, jump/branch statements, and the like. In some embodiments, the loop may be implemented in hardware only such as with an application-specific integrated circuit (ASIC) configured to implement the structure of the loop described herein using programming constructs.

At step 804, during each iteration of the loop, the top element is popped from the short stack data structure 750. The top element may include a node (or a pointer to a node) of the tree data structure 600. At step 806, the node is tested for intersection with a ray 690. At step 808, zero or more child nodes are pushed onto the top of the short stack data structure 750. At step 810, the processor, such as PPU 200, determines whether the short stack data structure 750 is empty. If the short stack data structure 750 is not empty, then the method 800 returns to step 804 and the next node is popped from the top of the short stack data structure 750. However, if the short stack data structure 750 is empty, then the processor executes a back-tracking operation, such as the operation illustrated by method 820 of FIG. 8B.

Figure 8B:
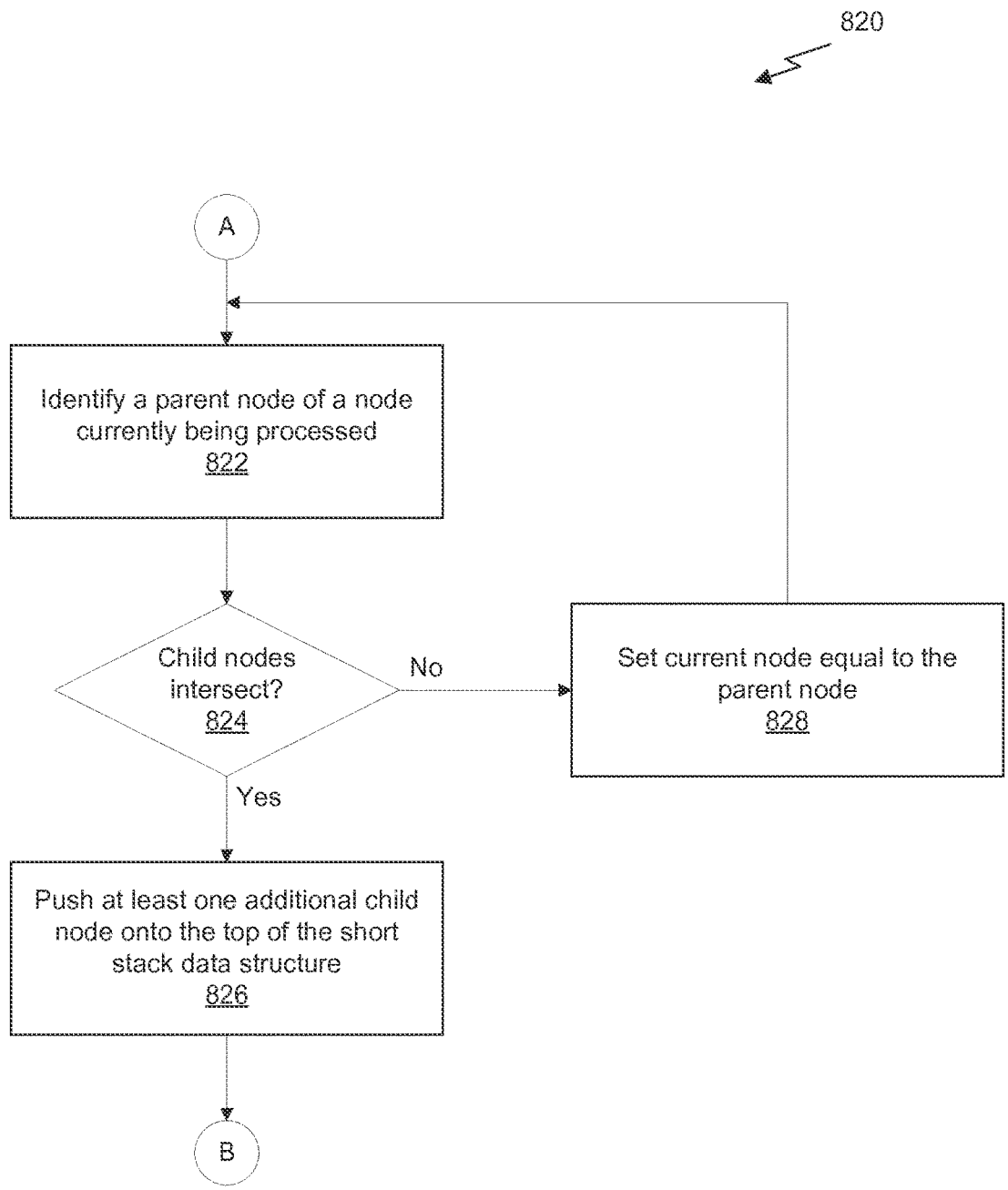
FIG. 8B illustrates a flowchart of a method for performing a back-tracking operation that supplements the tree traversal operation of method, in accordance with one embodiment.

FIG. 8B illustrates a flowchart of a method 820 for performing a back-tracking operation that supplements the tree traversal operation of method 800, in accordance with one embodiment. The method 820 may be performed by a processor such as PPU 200. At step 822, a parent node is identified for a node currently being processed. A pointer to a corresponding parent node may be included in the data structure for each node in the tree data structure 600. At step 824, the processor, such as PPU 200, determines whether at least one additional child node of the parent node intersects the ray 690 and still needs to be processed. The at least one additional child node may be any child nodes of the parent nodes having a child index that is greater than the child index of the current node. At step 826, if at least one additional child node of the parent node intersects the ray, then at least one additional child node is pushed onto the top of the short stack data structure 750. After step 826, the tree traversal operation of method 800 is continued for any nodes included in the short stack data structure 750 at step 804. Returning to step 824, if no additional child nodes of the parent node intersect the ray 690 or any additional child nodes of the parent node that intersect the ray 690 have already been processed, then the current node is set equal to the parent node and the back-tracking operation is repeated by returning to step 822.

It will be appreciated that the methods 800 and 820 of FIGS. 8A & 8B are similar to the techniques described above as illustrated by FIGS. 7A-7C. However, alternate embodiments may modify the methods 800 and 820 to have similar functionality to the techniques described above as illustrated by FIGS. 7D & 7E. Furthermore, although the methods 800 and 820 have been described as applied to a ray data structure, ray 690, the methods 800 and 820 may be modified and applied using any query data structure.

Figure 9:
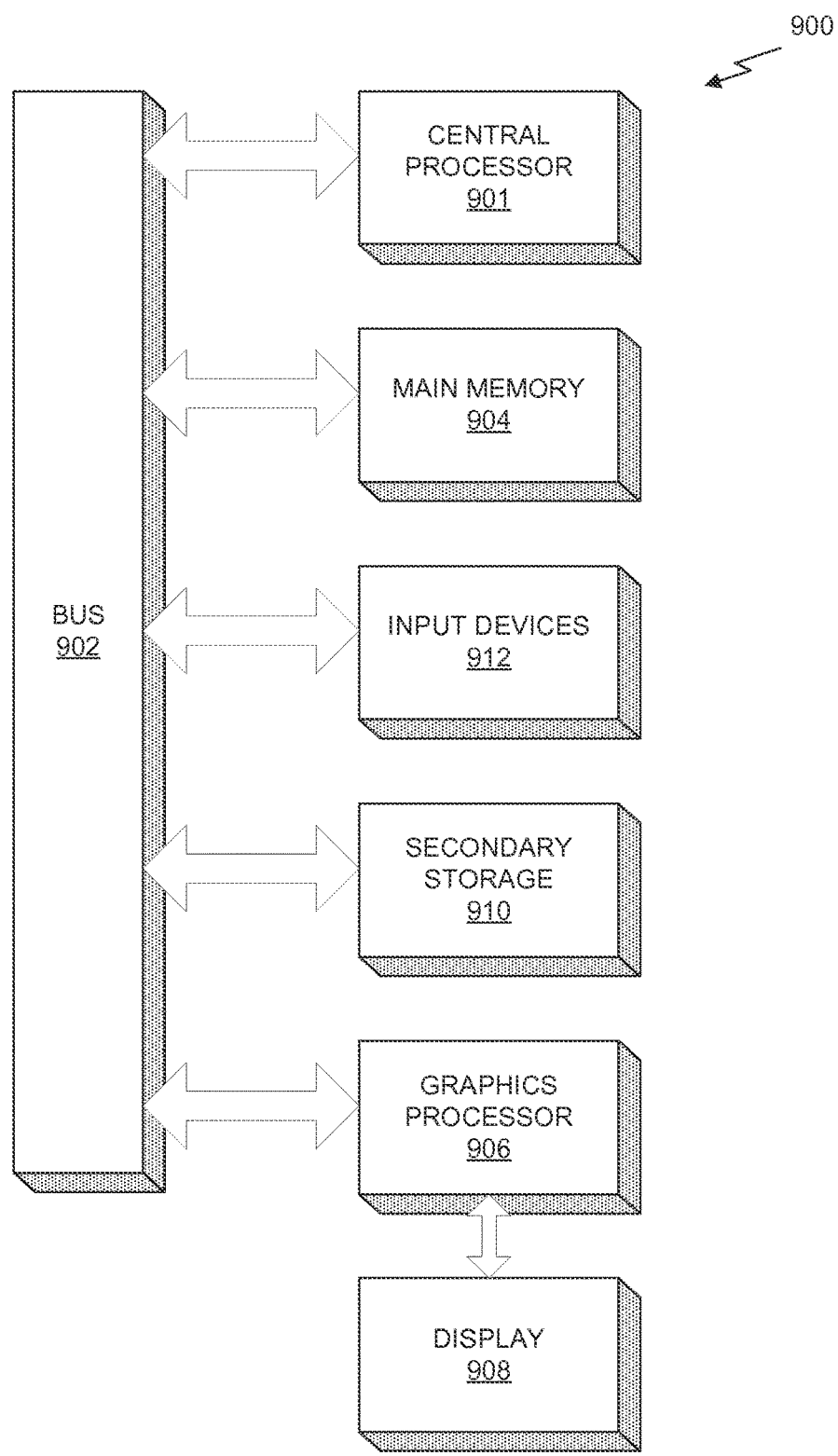
FIG. 9 illustrates an exemplary system in which the various architecture and/or functionality of the various previous embodiments may be implemented.

FIG. 9 illustrates an exemplary system 900 in which the various architecture and/or functionality of the various previous embodiments may be implemented. As shown, a system 900 is provided including at least one central processor 901 that is connected to a communication bus 902. The communication bus 902 may be implemented using any suitable protocol, such as PCI (Peripheral Component Interconnect), PCI-Express. AGP (Accelerated Graphics Port), HyperTransport, or any other bus or point-to-point communication protocol(s). The system 900 also includes a main memory 904. Control logic (software) and data are stored in the main memory 904 which may take the form of random access memory (RAM).

The system 900 also includes input devices 912, a graphics processor 906, and a display 908, i.e. a conventional CRT (cathode ray tube), LCD (liquid crystal display), LED (light emitting diode), plasma display or the like. User input may be received from the input devices 912, e.g., keyboard, mouse, touchpad, microphone, and the like. In one embodiment, the graphics processor 906 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 900 may also include a secondary storage 910. The secondary storage 910 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 904 and/or the secondary storage 910. Such computer programs, when executed, enable the system 900 to perform various functions. The memory 904, the storage 910, and/or any other storage are possible examples of computer-readable media.

In one embodiment, the architecture and/or functionality of the various previous figures may be implemented in the context of the central processor 901, the graphics processor 906, an integrated circuit (not shown) that is capable of at least a portion of the capabilities of both the central processor 901 and the graphics processor 906, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 900 may take the form of a desktop computer, laptop computer, server, workstation, game consoles, embedded system, and/or any other type of logic. Still yet, the system 900 may take the form of various other devices including, but not limited to a personal digital assistant (PDA) device, a mobile phone device, a television, etc.

Further, while not shown, the system 900 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   executing, via a tree traversal unit within a processor, a tree traversal operation for a tree data structure utilizing a portion of memory within the processor allocated to a short stack data structure that is sized to include a fixed number of slots;
   determining that the short stack data structure is empty after testing a current node in the tree traversal operation;
   in response to determining the short stack data structure is empty, the tree traversal unit executes a back-tracking operation for the current node by ascending up the tree data structure from a parent node of the current node to identify an untested node in the tree data structure;
   pushing the untested node onto the short stack data structure to continue the tree traversal operation beginning at the untested node; and
   generating image data based on data associated with the nodes of the tree data structure that are intersected by rays according to the testing.

2. The method of claim 1, wherein each slot is configured to temporarily store a pointer to a node of the tree data structure.

3. The method of claim 1, further comprising:
   setting a flag variable to an initial value before beginning the tree traversal operation; and
   setting the flag variable to a new value when at least one node is dropped from the bottom of the short stack data structure during execution of the tree traversal operation, wherein the flag variable is maintained until the short stack structure becomes empty.

4. The method of claim 3, wherein the back-tracking operation is conditionally performed based on the flag variable when the short stack data structure is empty.

5. The method of claim 3, wherein the flag variable stores a binary value.

6. The method of claim 3, wherein the flag variable stores a counter.

7. The method of claim 1, wherein the back-tracking operation comprises:
   determining that at least one other child node of the parent node intersects a query data structure; and
   pushing the at least one other child node onto the short stack data structure and continuing the tree traversal operation,
   wherein each node in the at least one other child node is later in the traversal order than the current node.

8. The method of claim 1, wherein the back-tracking operation comprises:
   pushing the parent node onto the short stack data structure; and
   storing a value in a state variable to indicate that the parent node is entered from the current node before continuing the tree traversal operation.

9. The method of claim 1, wherein the back-tracking operation comprises:
   determining that no other child node of the parent node intersects the query data structure, wherein each other child node is later in the traversal order than the current node;
   setting the current node equal to the parent node; and
   repeating the back-tracking operation.

10. The method of claim 1, further comprising generating a color value for a pixel intersected by a ray and a geometric primitive included in the current node.

11. A non-transitory computer-readable storage medium storing instructions that, when executed by a processor, cause the processor to perform steps comprising:
    executing, via a tree traversal unit within the processor, a tree traversal operation for a tree data structure utilizing a portion of memory within the processor allocated to a short stack data structure that is sized to include a fixed number of slots;
    determining that the short stack data structure is empty after testing a current node in the tree traversal operation;
    in response to determining the short stack data structure is empty, executing, via the tree traversal unit, a back-tracking operation for the current node by ascending up the tree data structure from a parent node of the current node to identify an untested node in the tree data structure;
    pushing the untested node onto the short stack data structure to continue the tree traversal operation beginning at the untested node; and generating image data based on data associated with the nodes of the tree data structure that are intersected by rays according to the testing.

12. The non-transitory computer-readable storage medium of claim 11, the steps further comprising:
   setting a flag variable to an initial value before beginning the tree traversal operation;
   setting the flag variable to a new value when at least one node is dropped from the bottom of the short stack data structure during continuation of the tree traversal operation, wherein the flag variable is maintained until the short stack structure becomes empty.

13. The computer-readable medium of claim 12, wherein the back-tracking operation is conditionally performed based on the flag variable when the short stack data structure is empty.

14. The non-transitory computer-readable storage medium of claim 11, wherein the back-tracking operation comprises:
   determining that at least one other child node of the parent node intersects a query data structure; and
   pushing the at least one other child node onto the short stack data structure and continuing the tree traversal operation, wherein each node in the at least one other child node is later in the traversal order than the current node.

15. The non-transitory computer-readable storage medium of claim 11, wherein the back-tracking operation comprises:
   pushing the parent node onto the short stack data structure; and
   storing a value in a state variable to indicate that the parent node is entered from the current node before continuing the tree traversal operation.

16. A system, comprising:
   a parallel processing unit that includes at least one tree traversal unit configured to:
      perform a tree traversal operation of a tree data structure utilizing a portion of memory within the parallel processing unit allocated to a short stack data structure that is sized to include a fixed number of slots,
      determine that the short stack data structure is empty after testing a current node in the tree traversal operation,
      perform, in response to determining the short stack data structure is empty, a back-tracking operation for the current node by ascending up the tree data structure from a parent node of the current node to identify an untested node in the tree data structure, and
      push the untested node onto the short stack data structure to continue the tree traversal operation beginning at the untested node, wherein image data is generated based on data associated with the nodes of the tree data structure that are intersected by rays according to the testing.

17. The system of claim 16, wherein the back-tracking operation comprises:
   determining that at least one other child node of the parent node intersects a query data structure; and
   pushing the at least one other child node onto the short stack data structure and continuing the tree traversal operation, wherein each node in the at least one other child node is later in the traversal order than the current node.

18. The system of claim 16, wherein the back-tracking operation comprises:
   pushing the parent node onto the short stack data structure; and
   storing a value in a state variable to indicate that the parent node is entered from the current node before continuing the tree traversal operation.

19. The system of claim 16, wherein the at least one tree traversal unit is configured to:
   set a flag variable to an initial value before beginning the back-tracking operation; and
   set the flag variable to a new value when at least one node is dropped from the bottom of the short stack data structure during execution of the tree traversal operation, wherein the flag variable is maintained until the short stack structure becomes empty.

20. The system of claim 19, wherein the back-tracking operation is conditionally performed based on the flag variable when the short stack data structure is empty.

21. The system of claim 16, wherein the back-tracking operation comprises:
   determining that no other child node of the parent node intersects the query data structure, wherein each other child node is later in the traversal order than the current node;
   setting the current node equal to the parent node; and
   repeating the back-tracking operation.

* * * * *